(12) United States Patent
Fukuma et al.

(10) Patent No.: US 6,937,328 B2
(45) Date of Patent: Aug. 30, 2005

(54) METHOD FOR MEASURING REFRACTIVE POWER AND APPARATUS THEREFOR

(75) Inventors: Yasufumi Fukuma, Tokyo (JP); Takeyuki Kato, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 524 days.

(21) Appl. No.: 10/110,383

(22) PCT Filed: Aug. 13, 2001

(86) PCT No.: PCT/JP01/06982

§ 371 (c)(1),
(2), (4) Date: Apr. 10, 2002

(87) PCT Pub. No.: WO02/14826

PCT Pub. Date: Feb. 21, 2002

(65) Prior Publication Data

US 2002/0149745 A1 Oct. 17, 2002

(51) Int. Cl.⁷ ............................................... G01N 21/41
(52) U.S. Cl. ..................................... 356/128; 356/124
(58) Field of Search ................................ 356/128, 124; 382/141, 125, 128, 129, 131

(56) References Cited

U.S. PATENT DOCUMENTS 4,796,991 A * 1/1989 Gordon et al. .............. 356/125
5,886,780 A    3/1999 Fukuma et al.
5,995,213 A * 11/1999 Davis et al. ................. 356/124
6,147,751 A * 11/2000 Abitbol ....................... 356/128
6,314,199 B1 * 11/2001 Hofer et al. ................. 382/141

FOREIGN PATENT DOCUMENTS

| GB | 2 056 702 A | 3/1981 | ............ G02B/7/02 |
| JP | 6-40834 | 5/1994 | .......... G01M/11/02 |
| JP | 11 083677 A | 3/1999 | .......... G01M/11/02 |
| JP | 11-16021 | 6/1999 | .......... G01M/11/02 |

* cited by examiner

Primary Examiner—Gregory J. Toatley, Jr.
Assistant Examiner—Roy M. Punnoose
(74) Attorney, Agent, or Firm—Chapman and Cutler LLP

(57) ABSTRACT

A refractive power measuring method is disclosed wherein a pattern plate 8 is disposed at a certain position in a measuring optical path in a measuring optical system 1, a measuring light emitted from a measuring light source 5 is received by a photosensor 9 through the pattern plate 8, a soft contact lens TL is disposed at a certain position in the measuring optical path, and a change of a pattern light received by the photosensor 9 is obtained to determine optical characteristic values of the soft contact lens. According to this method, the soft contact lens TL is disposed in a wet state at a certain position of the measuring optical path and scattered light resulting from scatter of the measuring light on a surface of the soft contact lens TL is received by the photosensor 9, then a state of scatter of the scattered light is determined from a change of a received light signal outputted from the photosensor 9 and there are obtained optical characteristic values when the received light signal is below a preset value.

42 Claims, 27 Drawing Sheets

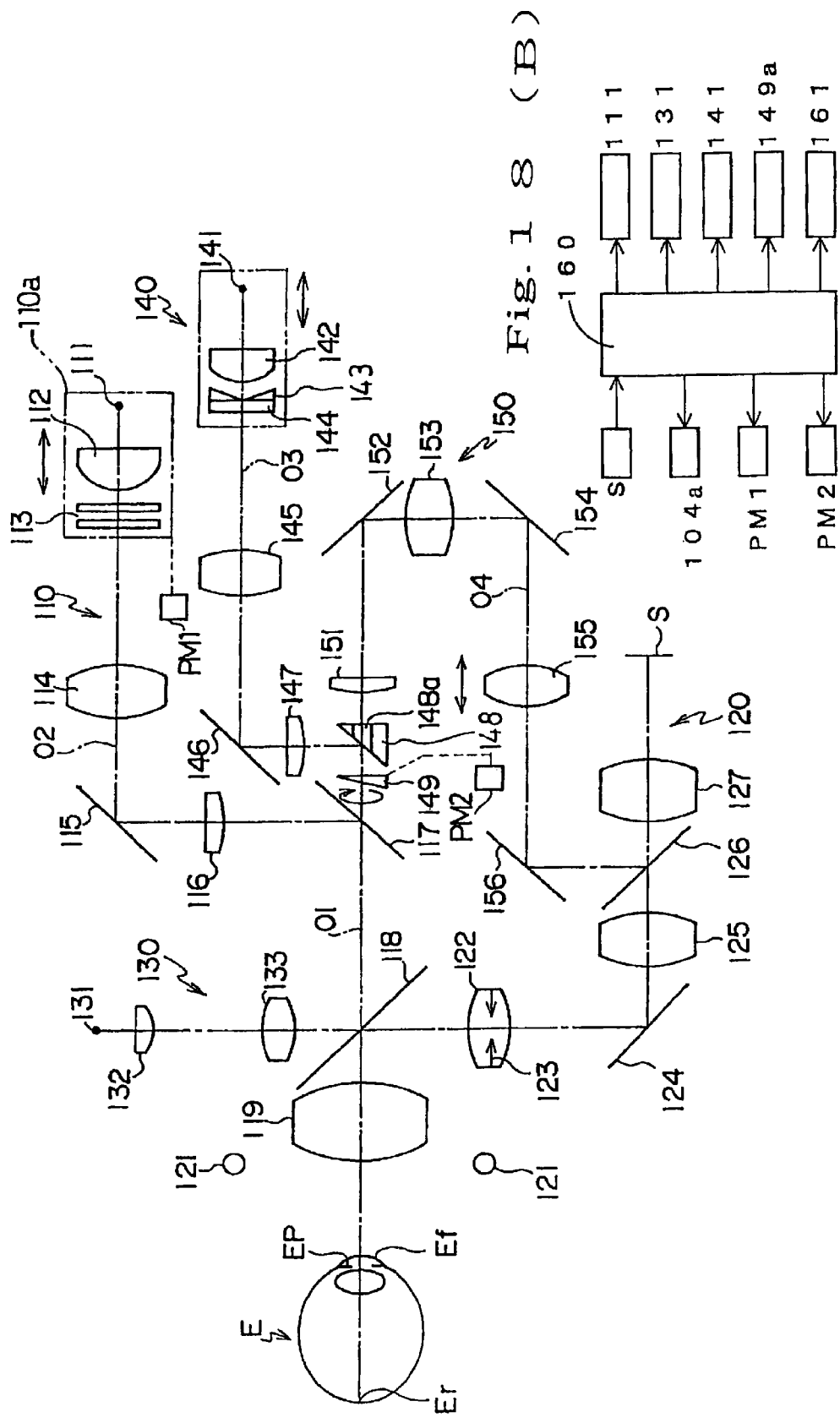

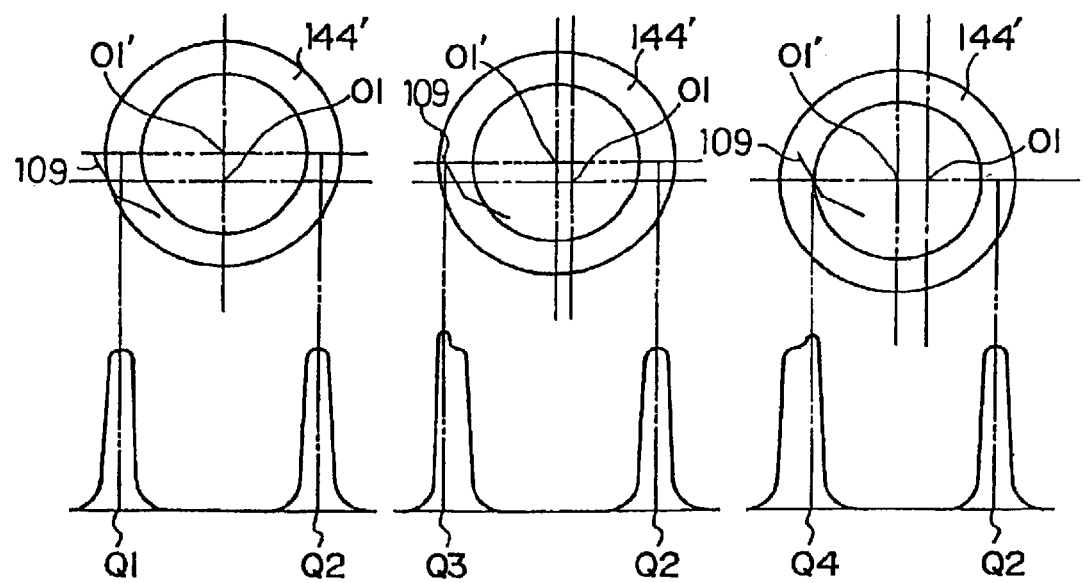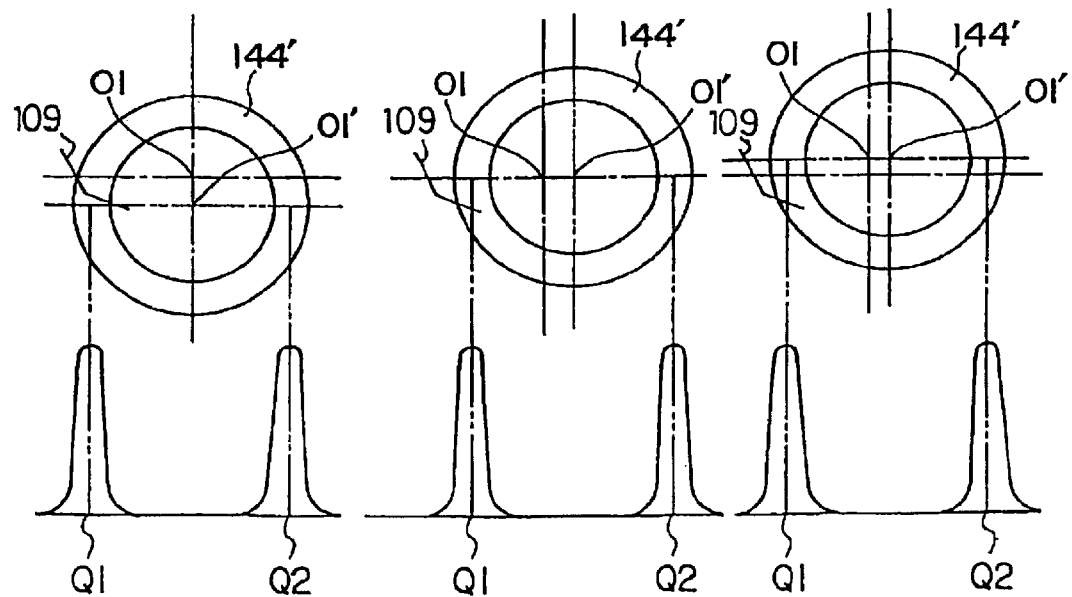

METHOD FOR MEASURING REFRACTIVE POWER AND APPARATUS THEREFOR

TECHNICAL FIELD

The present invention relates to a refractive power measuring method and apparatus able to measure optical characteristic values of a soft contact lens precisely in air.

BACKGROUND ART

Heretofore, it has been known that a soft contact lens is softer than a hard contact lens and that when a soft contact lens is subjected to measurement while being held on a lens receiving plate in air, the shape thereof is apt to be deformed by its own weight.

Besides, a large amount of water is contained in the soft contact lens, so if the soft contact lens is allowed to stand in air for a long time, the water contained therein will evaporate. Consequently, if optical characteristics of the soft contact lens are measured in air by means of a lens meter, an error is apt to occur in measured values. To avoid this inconvenience, both skill and rapidness of measurement are required for the measurement of a soft contact lens.

To meet this requirement, a lens meter is being developed which measures optical characteristic values of a soft contact lens while dipping the contact lens in liquid to retain the shape thereof.

Since this lens meter can measure optical characteristic values while retaining the shape of a soft contact lens and without evaporation of water, skill is not so strictly required, nor is required so high rapidness, in the measurement.

However, optical characteristic values of a soft contact lens measured in liquid and those measured in air are different. In more particular terms, when measurement is made in liquid, the difference between the refractive index of a soft contact lens and that of the liquid is smaller than the difference between the refractive index of the soft contact lens and that of air. Consequently, optical characteristic values of a soft contact lens measured in liquid are smaller than those of the same contact lens measured in air.

Therefore, when optical characteristic values of a soft contact lens are measured in liquid, it is necessary to convert them into optical characteristic values in air, and the refractive index of the material of the soft contact lens is needed for the said conversion.

However, the refractive index of the material of a soft contact lens is unknown in many cases, so it is impossible to make conversion from optical characteristic values of a contact lens measured in liquid into optical characteristic values thereof in air which are optical characteristic values obtained when the contact lens is applied to an eye, and there exists a problem that converted optical characteristic values obtained by the conversion of optical characteristic values of a contact lens measured in liquid are poor in reliability.

The present invention has been accomplished in view of the above-mentioned circumstances and it is an object of the invention to provide a refractive power measuring method and apparatus able to measure optical characteristic values of a soft contact lens precisely in air.

DISCLOSURE OF INVENTION

For achieving the above-mentioned object, in one aspect of the present invention there is provided a refractive power measuring method for obtaining optical characteristic values of a soft contact lens, characterized in that when the contact lens is disposed in a wet state in air and at a certain position in a measuring optical path, scattered light from the soft contact lens is received by a light receiving element, then a state of scatter of the scattered light is detected from a change of a received light signal outputted from the light receiving element which receives the scattered light, and the optical characteristic values are obtained when the received light signal satisfies a predetermined condition.

In another aspect of the present invention there is provided a refractive power measuring apparatus for obtaining optical characteristic values of a soft contact lens, comprising:

a light receiving element which receives scattered light from the soft contact lens when the soft contact lens is disposed in a wet state in air and at a certain position in a measuring optical path; and a calculation means which calculates the optical characteristic values when a received light signal outputted from the light receiving element satisfies a predetermined condition.

In a further aspect of the present invention there is provided a refractive power measuring apparatus comprising:

a measuring optical system including a pattern light forming means disposed at a certain position in a measuring optical path extending from a light source to a light receiving element, a measuring light from the light source being made into a pattern light by the pattern light forming means and the pattern light being received by the light receiving element; and an arithmetic and control circuit which, when a soft contact lens is disposed at a certain position in the measuring optical path, determines a change of the pattern light received by the light receiving element from a change of a received light signal outputted from the light receiving element, thereby obtaining optical characteristic values of the soft contact lens disposed at a certain position in the measuring optical path, wherein a scattered light receiving portion for receiving scattered light and outputting a received scattered light signal is provided separately from the light receiving element, the scattered light being generated when the measuring light passes through the soft contact lens, and the arithmetic and control circuit determines the optical characteristic values from the received light salt when the received scattered light signal is below a preset value from the time when the soft contact lens is set in a wet state onto a lens rest and measurement is started.

In a still further aspect of the present invention there is provided a refractive power measuring apparatus comprising:

a measuring optical system which projects a measuring light on a soft contact lens set on a lens rest and wet with liquid;

a light receiving optical system having a light receiving means for receiving the measuring light which has passed through the soft contact lens; and a calculation means which calculates optical characteristics of the soft contact lens at every predetermined time in accordance with an output signal provided from the light receiving means;

wherein there is provided a decision means which determines correct optical characteristics of the liquid-wet soft contact lens from a time series of optical characteristics calculated by the calculation means.

In a still further aspect of the present invention there is provided a refractive power measuring apparatus comprising:

a measuring optical system which projects a measuring light onto a soft contact lens set on a lens rest and wet with liquid;

a light receiving optical system having a light receiving means for receiving the measuring light which has passed through the soft contact lens; and a calculation means which calculates optical characteristics of the soft contact lens at every predetermined time in accordance with an output signal provided from the light receiving means, wherein there are provided:

a storage means which stores in time series the optical characteristics calculated by the calculation means; and a decision means for determining correct optical characteristics of the liquid-wet soft contact lens from the optical characteristics stored in time series in the storage means.

BRIEF DESCRIPTION OF DRAWINGS

FIG. 12 is a perspective view of an ophthalmic refractive power measuring apparatus (a contact lens optical characteristics measuring apparatus) according to a second embodiment of the present invention;

FIG. 18 is an explanatory diagram of an optical system in the ophthalmic refractive power measuring apparatus of the second embodiment;

FIG. 19 is an explanatory diagram showing a state of a pattern image formed on the eyeground by the optical system shown in FIG. 18;

FIGS. 22(A) to (F) are explanatory diagrams each showing a relation between an arbitrarily stored example of the pattern image formed on the eyeground in FIG. 18 and peak positions corresponding to the pattern image;

BEST MODE FOR CARRYING OUT THE INVENTION

[First Embodiment]

A first embodiment of the present invention will be described hereinunder with reference to the drawings.

[Construction]

Figure 1:
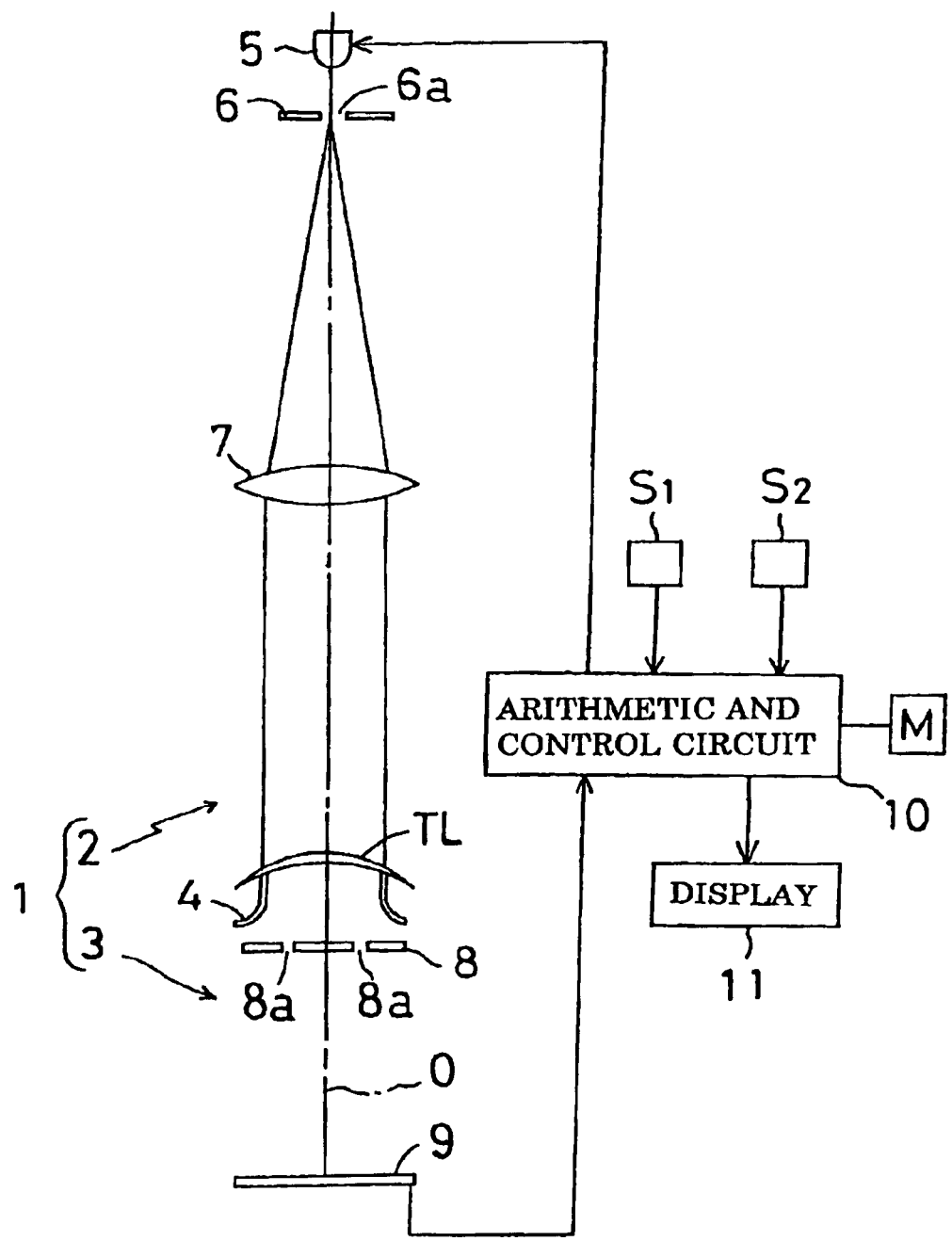
FIG. 1 illustrates an optical system of a lens meter as an example of an apparatus for measuring optical characteristics of a contact lens according to a first embodiment of the present invention, as well as an associated processing circuit in terms of a block diagram.

In FIG. 1, reference numeral 1 denotes a measuring optical system of a lens meter as an example of a refractive power measuring apparatus according to the first embodiment. The measuring optical system 1 has a measuring light projecting optical system 2 and a light receiving optical system 3, with a lens rest 4 being disposed between the optical systems 2 and 3.

Figure 2:
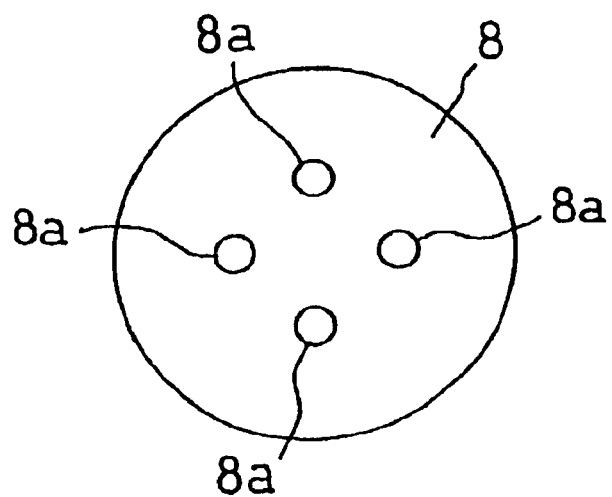
FIG. 2 is a plan view of a pattern plate shown in FIG. 1.

The measuring light projecting optical system 2 has a measuring light source 5, a pinhole plate 6, and a collimator lens 7. The light receiving optical system 3 has a pattern plate (pattern light forming means) 8 and a photosensor 9 such as an area CCD. Four aperture patterns 8a are formed in the pattern plate 8, as shown in FIG. 2. The whole surface of the photosensor 9 (light receiving means) as a light receiving element serves as a measuring signal receiving portion and a scattered light receiving portion. In FIG. 1, reference mark O denotes a measuring optical axis of the measuring optical system.

An output signal (received light signal) from the photosensor 9 is inputted to an arithmetic and control circuit (arithmetic and control means; calculation means) 10. More specifically, an output signal from a central side of the photosensor 9 is fed as a measured signal to the arithmetic and control circuit 10, while an output signal from a peripheral portion of the photosensor 9 is fed as a measured scattered light signal to the arithmetic and control circuit.

"ON" signals provided from switches S1 and S2, which are for switching from one measuring mode to another, are fed to the arithmetic and control circuit 10. The switch S1 functions to set the lens meter to a mode for measuring optical characteristic values in air of a soft contact lens. The switch S2 functions to set the lens meter to a mode for measuring a lens other than the soft contact lens, e.g., a hard contact lens measuring mode or a glasses lens measuring mode.

A display unit (display means) 11 such as a monitor television or a liquid crystal display, as well as a memory M, are connected to the arithmetic and control circuit 10. The arithmetic and control Circuit 10 determines S, C, A (wherein S is defined as spherical power, C is defined as cylindrical power, and A is defined as cylindrical axis) of a soft contact lens TL repeatedly at every short time. The 5, C, and A thus determined are displayed on the display unit 11 and the values of S, C, and A on the display unit 11 are updated at every measurement.

[Operation]

The function, as well as operation, of the arithmetic and control circuit 10 in the lens meter of such a construction will be described below.

When a power supply (not shown) is turned ON, the arithmetic and control circuit 10 operates to turn ON the measuring light source 5 in the measuring light projecting optical system 2. The measuring light (illuminating light) from the measuring light source 5 passes through a pinhole 6a formed in the pinhole plate 6 and then enters the collimator lens 7, whereby it is made into a parallel measuring beam (parallel beam). The parallel measuring beam is projected on the lens rest 4 side.

Figure 3:
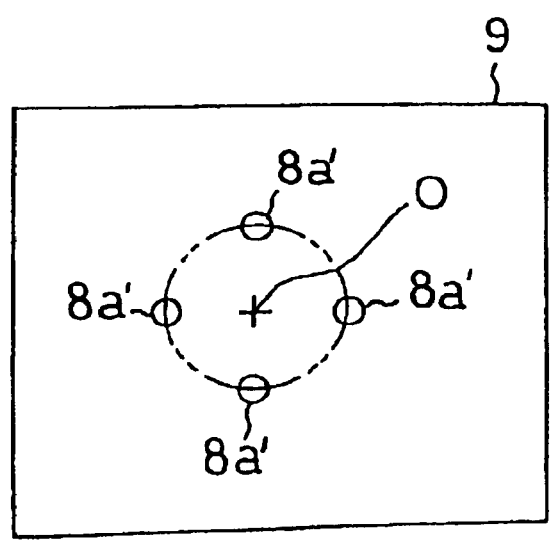
FIG. 3 is an explanatory diagram showing a relation between a photosensor shown in FIG. 1 and an aperature pattern image.

In the case where a lens to be inspected is not positioned on the lens rest 4, the four aperture patterns 8a of the pattern plate 8 are projected on the photosensor 9 directly as aperture pattern images 8a' through the parallel measuring beam, as shown in FIG. 3. At this time, a signal provided from the photosensor 9 is fed to the arithmetic and control circuit 10, which in turn stores coordinates of the aperture pattern images 8a' at this instant into the memory M as pattern reference data for the calculation of optical characteristics.

When a lens to be inspected is positioned on the lens rest 4, a parallel measuring beam passes through the lens to be inspected and is refracted. Thereafter, with the thus-refracted measuring beam, the four aperture patterns 8a of the pattern plate 8 are enlarged or reduced and projected as aperture pattern images onto the photosensor 9.

On the other hand, when the switch S1 is turned ON, the arithmetic and control circuit 10 sets the lens meter to a mode for measuring optical characteristic values in air of the soft contact lens. With the switch S2 turned ON, the arithmetic and control circuit 10 sets the lens meter to a mode for measuring a lens other than the soft contact lens, e.g., a hard contact lens measuring mode or a glasses lens measuring mode.

<Measuring the Soft Contact Lens>

Reference will here be made to the case where the soft contact lens is to he measured. A description will first be given about a surface condition of the soft contact lens TL.

(1) Change in Surface Condition of the Soft Contact Lens

Figure 4:
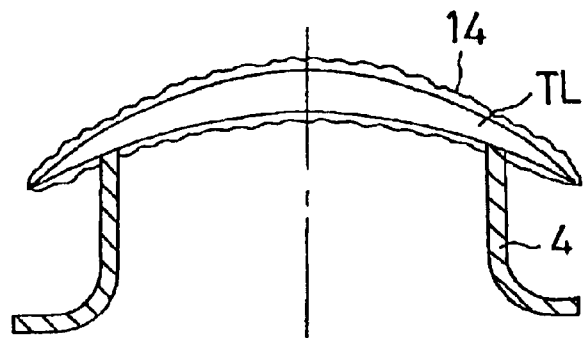
FIG. 4 illustrates exaggeratedly how a surface state of a soft contact lens associated with the present invention changes, in which (a) shows a wet state of the soft contact lens with a large amount of liquid, (b) shows a state in which the soft contact lens is wet with an appropriate amount of liquid and the surface thereof in smooth, and (c) shows a state in which the soft contact lens is dry and the surface thereof is rough.
Figure 4:
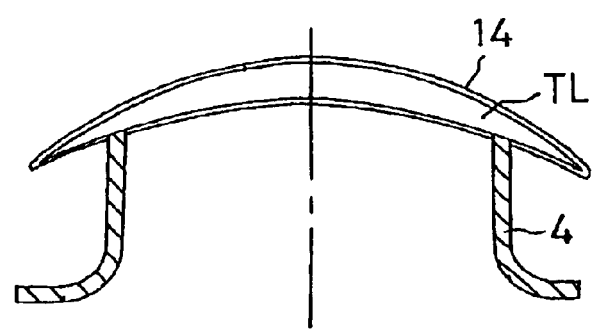
Figure 4:
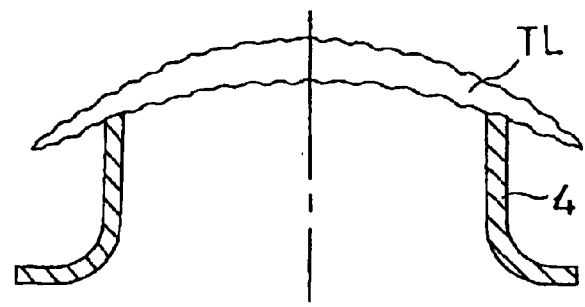
Figure 5:
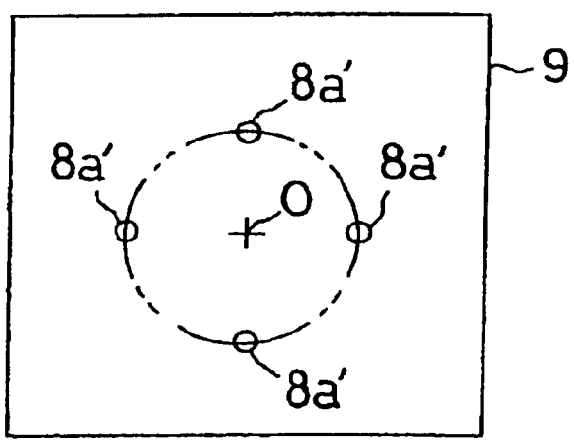
FIG. 5 is an explanatory diagram showing a relation between the photosensor shown in FIG. 1 and an aperture pattern image in measurement.

When the soft contact lens TL is placed on the lens rest 4 and the measurement of its optical characteristics is started, the soft contact lens TL, which 2 usually dipped in an isotonic sodium chloride solution within a lens receptacle, is taken out from the lens receptacle and is placed on the lens rest 4 as in FIG. 1. Just after the placing of the lens on the lens rest, a large amount of liquid 12 such as isotonic sodium chloride solution or water is deposited on the surface of the soft contact lens TL, as shown in FIG. 4(a).

In the case where the measurement of the soft contact lens TL is started upon the lapse of time and dying of the lens after placing of the lens on the lens rest 4, or when the measurement is started after placing a dry soft contact lens TL on the lens rest 4, liquid 14 such as isotonic sodium chloride solution or water is added dropwise onto the soft contact lens TL from a dropping pipette (not shown), allowing a large amount of the liquid 14 to be deposited on the surface of the soft contact lens TL, as shown in FIG. 4(a). This is because it is necessary that a refraction characteristic of the soft contact lens TL be measured under the same condition as a working condition.

From the start of measurement the soft contact lens TL changes successively like (i) a large amount of liquid holding state, (ii) a compatibility state, and (iii) a dried state.

(i) Initial Stage of Measurement (a Large Amount of Liquid Holding State)

When the measurement is started, the soft contact lens TL is wet into a state in which a large amount of liquid 14 is deposited on the lens surface, as shown in FIG. 4(a). In this state, the liquid 14 adheres as water drops in a concave-convex form onto the surface of the soft contact lens TL.

(ii) Intermediate Stage of Measurement (a Compatibility State)

During measurement, the liquid 14 deposited on the surface of the soft contact lens TL flows down along a curve of the lens surface, or a portion of the liquid 14 deposited on the lens surface evaporates or is absorbed by the soft contact lens TL, so that the liquid 14 becomes compatible with the lens. In this compatibility state, the liquid on the lens surface assumes ϵ layer form of a uniform thickness as shown in FIG. 4(b), or the lens surface dries moderately into a smooth state.

(iii) Last stage of measurement (a dried state)

Further, as the absorption of water by the soft contact lens TL proceeds, resulting in the lens becoming dry, a surface 14a and a back 14b of the lens are roughened as shown in FIG. 4(c).

(2) Measuring the Soft Contact Lens

For measuring optical characteristics of the soft contact lens, the switch S1 is turned ON to set the lens meter into the mode for measuring optical characteristic values in air of the lens.

Then, the soft contact lens TL is placed on the lens rest 4. In this state, the measuring light (illuminating light) from the measuring light source 5 passes through the pinhole 6a of the pinhole plate 6 and enters the collimator lens 7, whereby it is made into a parallel measuring beam (parallel beam). The parallel measuring beam is projected on the soft contact lens TL placed on the lens rest 4.

After the parallel measuring beam passes through the soft contact lens TL and is reacted, the four aperture patterns 8a of the pattern plate 8 are projected on the photosensor 9 by the refracted measuring beam.

Figure 6:
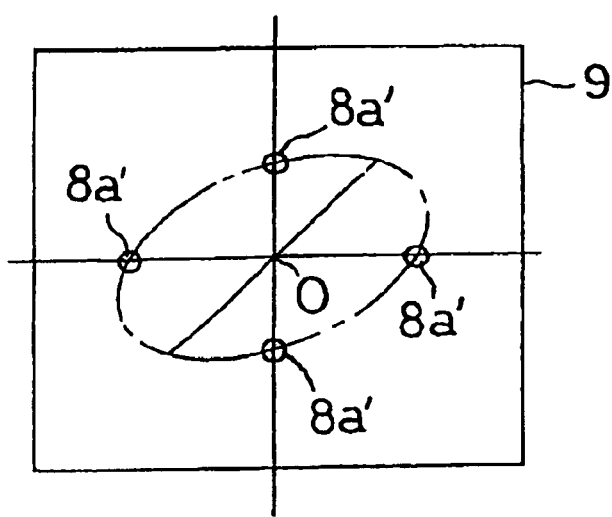
FIG. 6 is an explanatory diagram showing a relation between the photosensor shown in FIG. 1 and another aperture pattern image in measurement.

At this time, if the surface of the soft contact lens TL is smooth, the parallel measuring beam is refracted with only the refractive power of the lens TL and projects the four aperture patterns 8a onto the photosensor 9. Besides, according to whether the soft contact lens TL is a convex lens or a concave lens, the four aperture patterns 8a (their spacing and aperture diameter) are projected in an enlarged or reduced state onto the photosensor 9 and aperture pattern images 8a' of the thus-enlarged or—reduced four aperture patterns 8a are formed on the central side of the photosensor 9, as shown in FIG. 6. Further, when the soft contact lens TL has no cylindrical , the aperture pattern images 8a' of the four aperture patterns 8a are formed on a circle r centered at a measuring optical axis O. On the other hand, when the soft contact lens TL has a cylindrical axis, the aperture pattern images 8a' of the four aperture patterns 8a are formed on an ellipse centered at the measuring optical axis O, as shown in FIG. 6. The cylindrical axis is oriented in the major axis direction of the ellipse.

By obtaining an enlargement or reduction ratio of the aperture pattern images there are obtained optical characteristic values S, C, and A of the soft contact lens TL.

In measuring optical characteristics of the soft contact lens TL, the soft contact lens is fully wet with liquid 14 and then placed on the lens rest 4, or the liquid 14 is added dropwise to the soft contact lens placed on the lens rest 4 to wet the lens to a satisfactory extent. This is because it is necessary that a refraction characteristic of the soft contact lens TL be measured under the same condition as a working condition of the lens.

At the beginning of the measurement (initial stage of the measurement), however, the surface of the soft contact lens TL is uneven with a large amount of liquid 14 as in FIG. 4(a). Consequently, a parallel measuring beam incident on the soft contact lens TL at the beginning of the measurement is refracted by both a refractive power of the uneven liquid 14 deposited on the lens surface and a refractive power of the lens TL. Thus, the parallel measuring beam incident on the soft contact lens TL at the beginning of the measurement is refracted or scattered under the influence of the refractive power of the uneven liquid 14.

Figure 7:
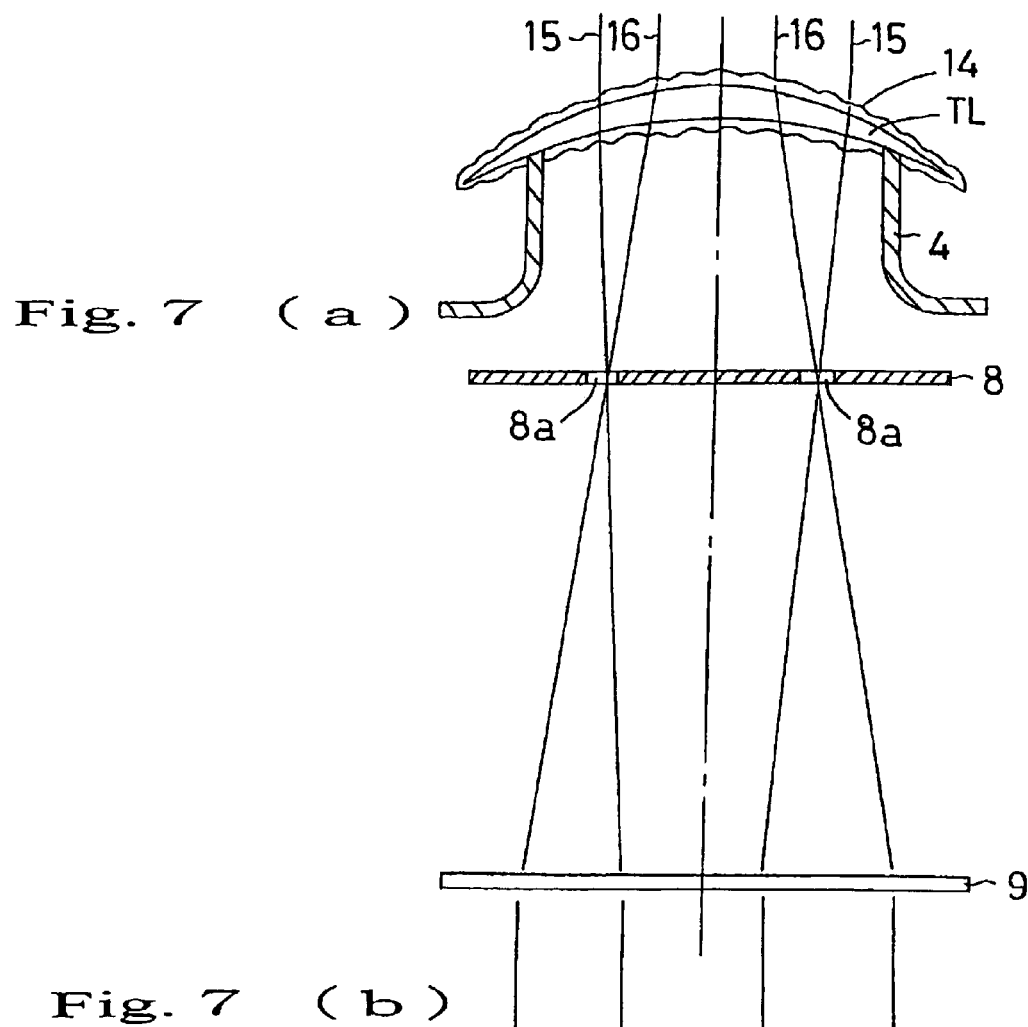
FIG. 7(a) is an explanatory diagram of a measuring light beam in the presence of scattered light and FIG. 7(b) is an explanatory diagram of an output of the photosensor based on the measuring light beam shown in FIG. 7(a)
Figure 7:
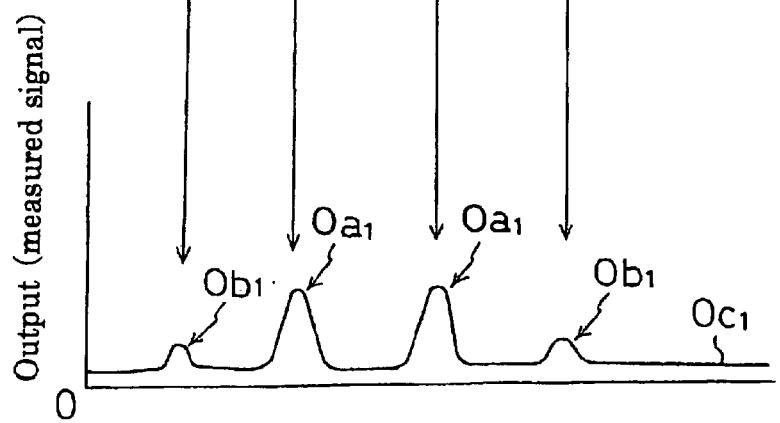

Consequently, the aperture pattern image of the four aperture patterns 8a, which are projected on the photosensor 9 with a measuring beam 15 shown in FIG. 7(a), are formed at positions offset from the circle or ellipse centered on the measuring optical axis O.

Besides, scattered light aperature images (not shown) of the aperture patterns 8a based on scattered light 16 are formed on the photosensor 9, as shown in FIG. 7(a). At this time, an output (measured signal) Oa1 based on the measuring beam 15, an output (measured scattered light signal) Ob1 based on the measuring beam 16, and a noise output Oc1 are obtained from the photosensor 9, as shown in FIG. 7(b). The noise output Oc1 is detected at about the same level throughout the whole of the photosensor 9. Thus, while the outputs Ob1 and Oc1 are detected, optical characteristics of the soft contact lens TL cannot be measured accurately.

Figure 8:
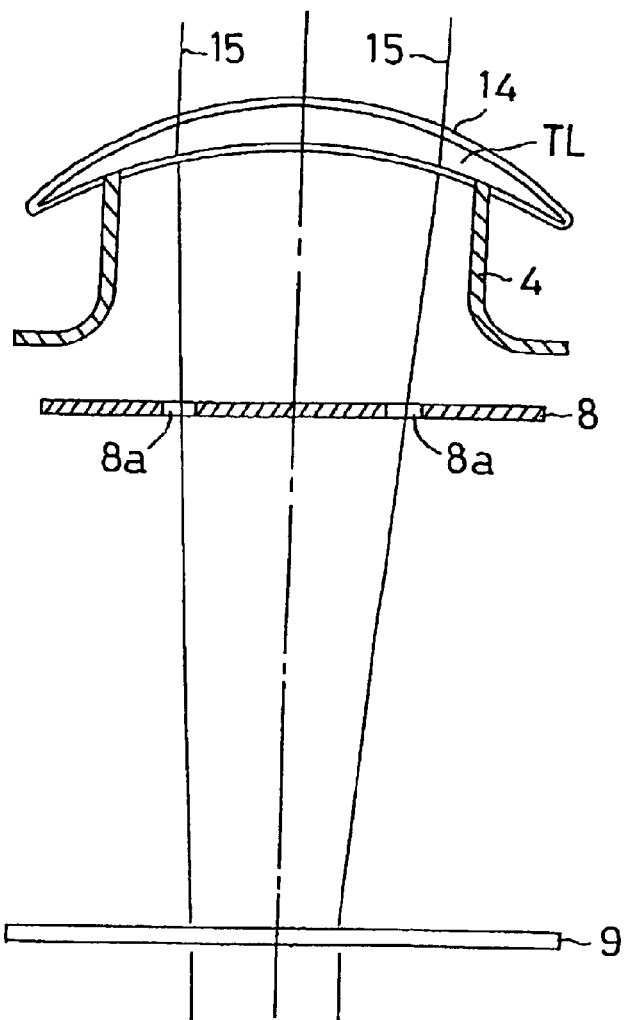
FIG. 8(a) is an explanatory diagram of a measuring light beam in the presence of scattered light and FIG. 8(b) is an explanatory diagram of an output of the photosensor based on the measuring light beam shown in FIG. 8(a)
Figure 8:
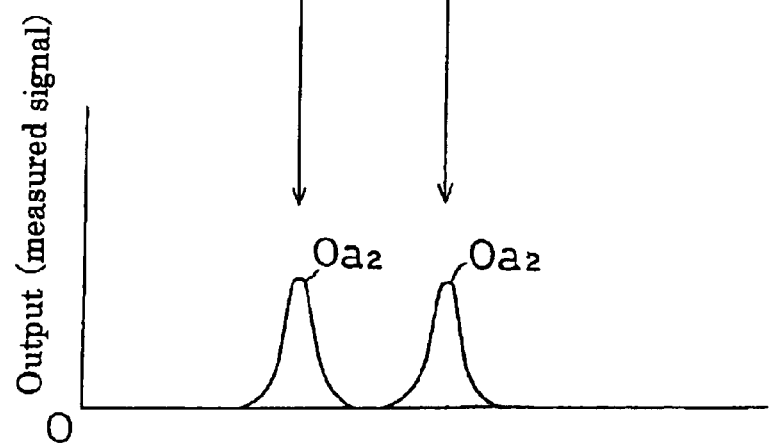

As the measurement time elapses, the liquid 14 present on the surface of the soft contact lens TL becomes thin and compatible with the lens surface, indicated at 14a, as shown in FIGS. 4(b) and 8(a), whereupon the output Ob1 from the photosensor 9 and the noise output Oc1 both shown in FIG. 7(b) become zero and are no longer outputted as in FIG. 8(b). At this time, the output Oa1 shown in FIG. 7(b) increases in the quantity of light correspondingly to the decrease (nearly zero) of scattered light and becomes clear, affording such an output Oa2 as shown in FIG. 8(b).

In this case, optical characteristic values S, C, A of the soft contact lens TL become equal in a precise sense to the optical characteristic values S, C, A in air which the original shape of the lens TL possesses. Therefore, the arithmetic and control circuit 10 detects measured signals provided from the photosensor 9, and when the outputs Ob1 and Oc1 have dropped below a predetermined value (below a preset value, i.e., nearly "0") (time t1 in FIG. 11 to be described later), the arithmetic and control circuit stores calculated optical characteristics S, C, and A into memory (not shown). The optical characteristics S, C, A thus stored in memory continue to be displayed on the display unit 11 without being updated.

Calculation of the optical characteristic values S, C, A is performed in the following manner. Coordinates of the outputs Oa2 (four outputs corresponding respectively to the four aperture patterns 8a) are stored as measurement pattern data into memory M, the arithmetic and control circuit 10 determines an enlargement or reduction ratio and a change of the aperture pattern images on the photosensor 9 on the basis of the measurement pattern data and reference pattern data and calculates optical characteristic values S, C, A of the soft contact lens TL.

Figure 9:
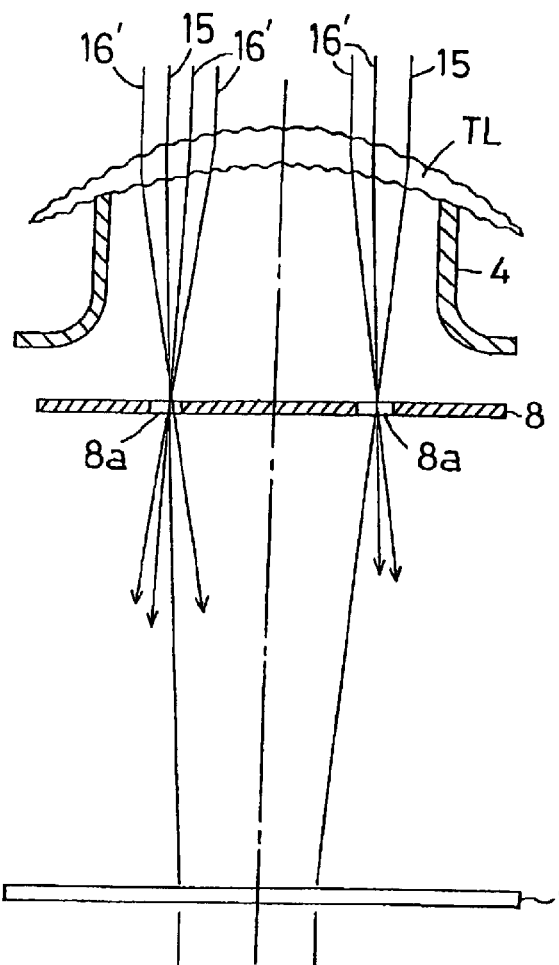
FIG. 9(a) is an explanatory diagram of a measuring light beam in the presence of scattered light and FIG. 9(b) is an explanatory diagram of an output of the photosensor based on the measuring light beam shown in FIG. 9(a)
Figure 9:
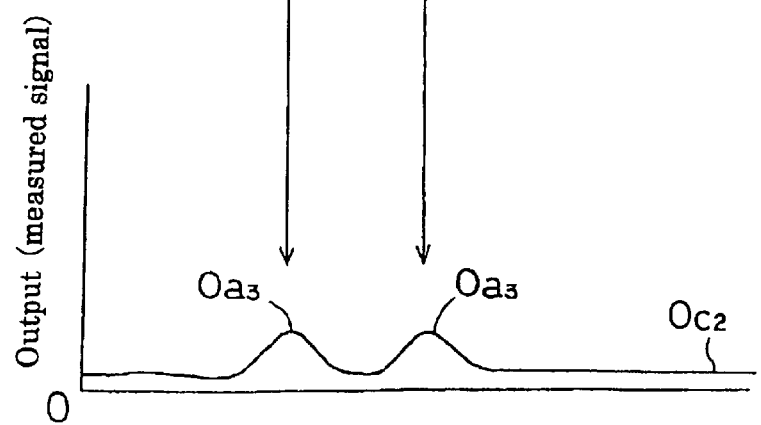

Further, as the measurement time elapses, the surface and the back of the soft contact lens TL arc roughened, as shown in FIGS. 4(c) and 9(a). At this time, scattered light 16' is projected substantially uniformly on the photosensor 9, as shown in FIG. 9(a), so that the quantity of light of the aperture patterns 8a projected on the photosensor 9 decreases and an output Oc2 based on the scattered light is obtained as noise. Consequently, the outputs Oa2 in FIG. 8(b) decrease in their quantity of light to a greater extent than the outputs Oa1 in FIG. 7(b), affording such outputs Oa3 as shown in FIG. 9(b). In this case, aperture pattern images of the aperture patterns 8a projected on the photosensor 9 through the soft contact lens TL are not obtained as clear images but are blurred, so that the optical characteristic values S, C, A obtained are different from optical characteristic values S, C, A in air which the original shape of the soft contact lens TL possesses. Thus, also in the case of FIG. 9 it is impossible to accurately measure the optical characteristics of the soft contact lens TL.

Figure 10:
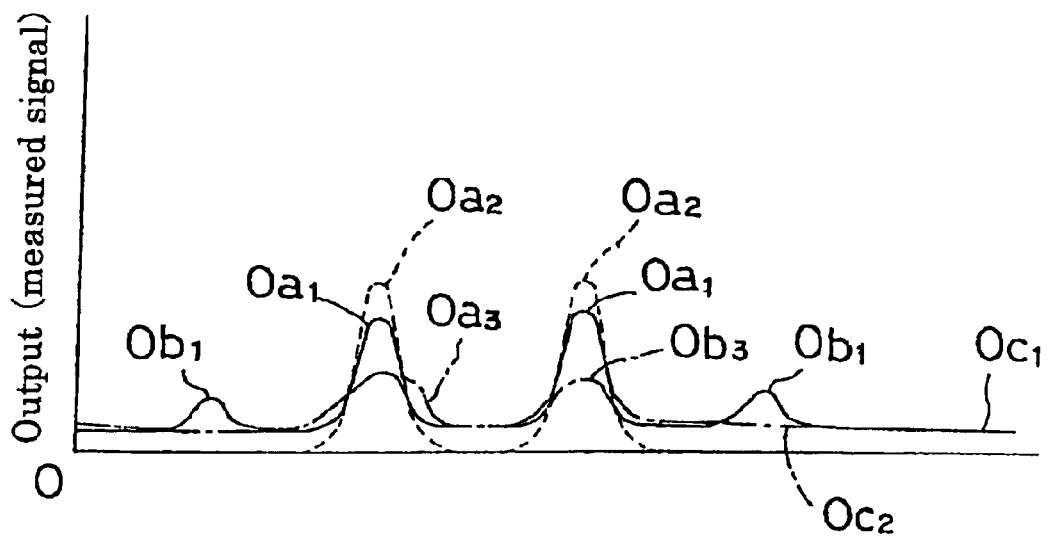
FIG. 10 is an explanatory diagram showing photosensor outputs in FIGS. 7(b) to 9(b) in an overlapped manner.

If such outputs of the photosensor 9 as shown in FIGS. 7(b) to 9(b) are overlap-displayed for comparison, the result is as shown in FIG. 10.

Figure 11:
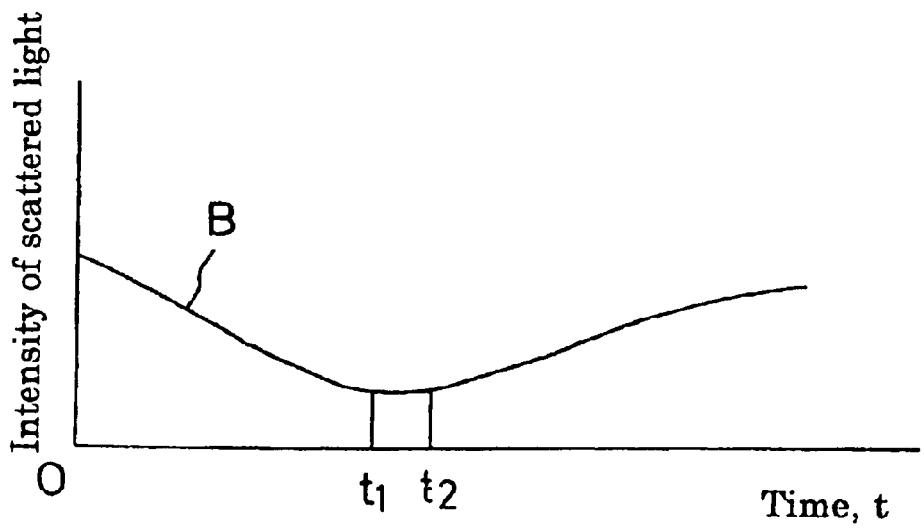
FIG. 11 is a scattered light intensity characteristic diagram showing a scattered light intensity with the lapse of time.
Figure 1:
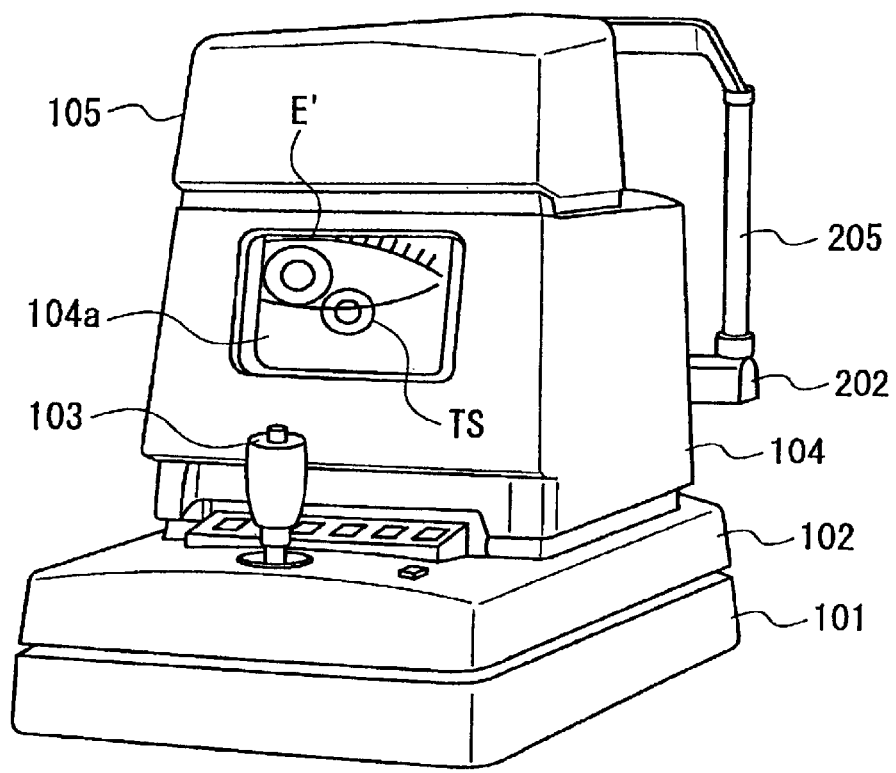

In the measurement of the soft contact lens TL, the scattered light intensity varies as indicated with a scattered light intensity curve B in FIG. 11. That is, at the beginning of the measurement, as shown in FIG. 7(a), the liquid 14 present on the surface of the soft contact lens TL is not uniform, so that the intensity of scattered light passing through the soft contact lens TL is high as at time "0" in FIG. 11. Since the liquid 14 on the lens surface becomes uniform gradually, the intensity of scattered light passing through the soft contact lens TL becomes small to near "0" as in FIG. 11. At a latter stage of the measurement after the time t2, as shown in FIG. 9(a), the surface of the soft contact lens TL becomes dry and fine concaves and convexes are formed thereon, which become larger gradually. Consequently, the intensity of scattered light passing through the soft contact lens TL becomes larger gradually, as shown in FIG. 11.

Thus, also from FIG. 11 it is seen that the optical characteristic values S, C, A of the soft contact lens TL can be obtained on the basis of the outputs Oa2 which are provided from the photosensor 9 during the period of time t1–t2.

The optical characteristic values S, C, A thus obtained are displayed on the display unit 11.

Although in the above embodiment the light of scattered light aperture images based on scattered light is detected by utilizing a part of the photosensor 9, a photosensor (light receiving element) separate from the photosensor 9 may be provided as a scattered light receiving portion.

(3) Others

In the method for measuring optical characteristics of a soft contact lens according to the present invention, as described above, the pattern plate (pattern light forming means) 8 is disposed at a certain position in the measuring optical path of the measuring optical system 1 extending from the measuring light source 5 to the photosensor (light receiving element) 9, the measuring light from the light source 5 is made into a pattern light by the pattern plate 8, which pattern light is allowed to be received by the photosensor 9, and when the soft contact lens TL is disposed at a certain position in the measuring optical path, a change of the pattern light received by the photosensor 9 is determined from a change of the measured signal outputted from the photosensor 9, thereby obtaining optical characteristic values of the soft contact lens TL disposed at a certain position in the measuring optical path. Besides, the soft contact lens TL, which is in a wet state, is in air and at a certain position in the measuring optical path and scattered light developed upon scattering of the measuring light after passing through the soft contact lens TL is received by the photosensor 9, whereupon measurement is started. Further, a state of scatter of the scattered light is determined from a change of the measured signal caused by a change of the pattern light which is received by the photosensor 9, and the optical characteristic values are obtained when the measured signal outputted from the photosensor 9 has attenuated to below a preset value.

In this optical characteristics measuring method for the soft contact lens it is desirable that the soft contact lens TL be wet with liquid such as an isotonic sodium chloride solution or water at the time of starting the measurement.

The measurement comprises a first stage in which a large amount of liquid is deposited on the surface of the soft contact lens TL, a medium stage in which the liquid is absorbed by the soft contact lens TL or evaporates or flows down and the liquid on the lens surface forms a uniform layer, and a last stage in which the absorption of water by the soft contact lens TL and drying proceed and the lens surface becomes rough. By obtaining optical characteristics of the soft contact lens TL from the measuring signal in the above medium stage there can be obtained accurate results.

The apparatus for measuring optical characteristics of a soft contact lens according to the present invention comprises the measuring optical system 1 in which the pattern plate (pattern light forming means) 8 is disposed at a certain position in a measuring optical path extending from the light source 5 to the photosensor (light receiving element) 9 to make the measuring light omitted from the light source 5 into a pattern light, allowing the pattern light to be received by the photosensor 9, and the arithmetic and control circuit 10 which, when the soft contact lens TL is disposed at a certain position in the measuring optical path, determines a change of the pattern light received by the photo sensor 9 on the basis of a change of a measured signal provided from the photosensor, thereby obtaining optical characteristic values of the soft contact lens TL disposed at a certain position in the measuring optical path. The photosensor 9 is provided so that it can receive scattered light developed upon passage of the measuring light through the soft contact lens TL and output a measured scattered light signal. The arithmetic and control circuit 10 determines the optical characteristic values from the measured signal when the measured scattered light signal is blow a preset value after the start of measurement with the soft contact lens TL placed on the lens rest 4 at a certain position in the measuring optical path.

As noted above, the scattered light receiving portion which receives scattered light generated upon passage of the measuring light through the soft contact lens and which outputs a measured scattered light signal may be provided separately from the photosensor (light receiving element) 9.

[Second Embodiment]

[Construction]

Figure 13:
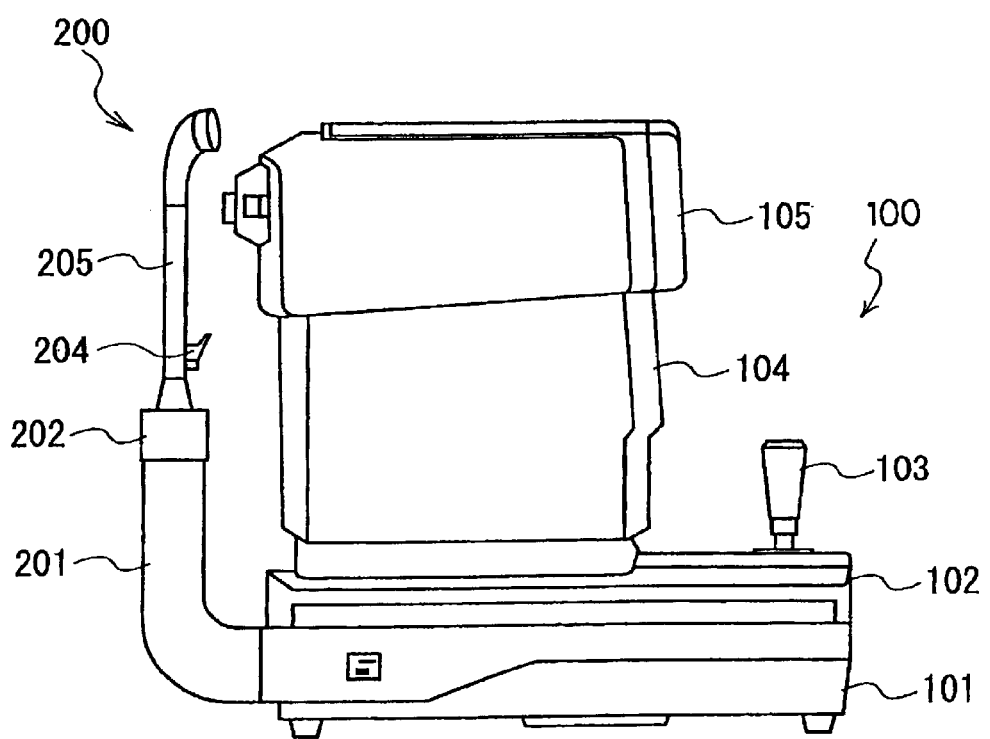
FIG. 13 is a left side view of FIG. 12.
Figure 14:
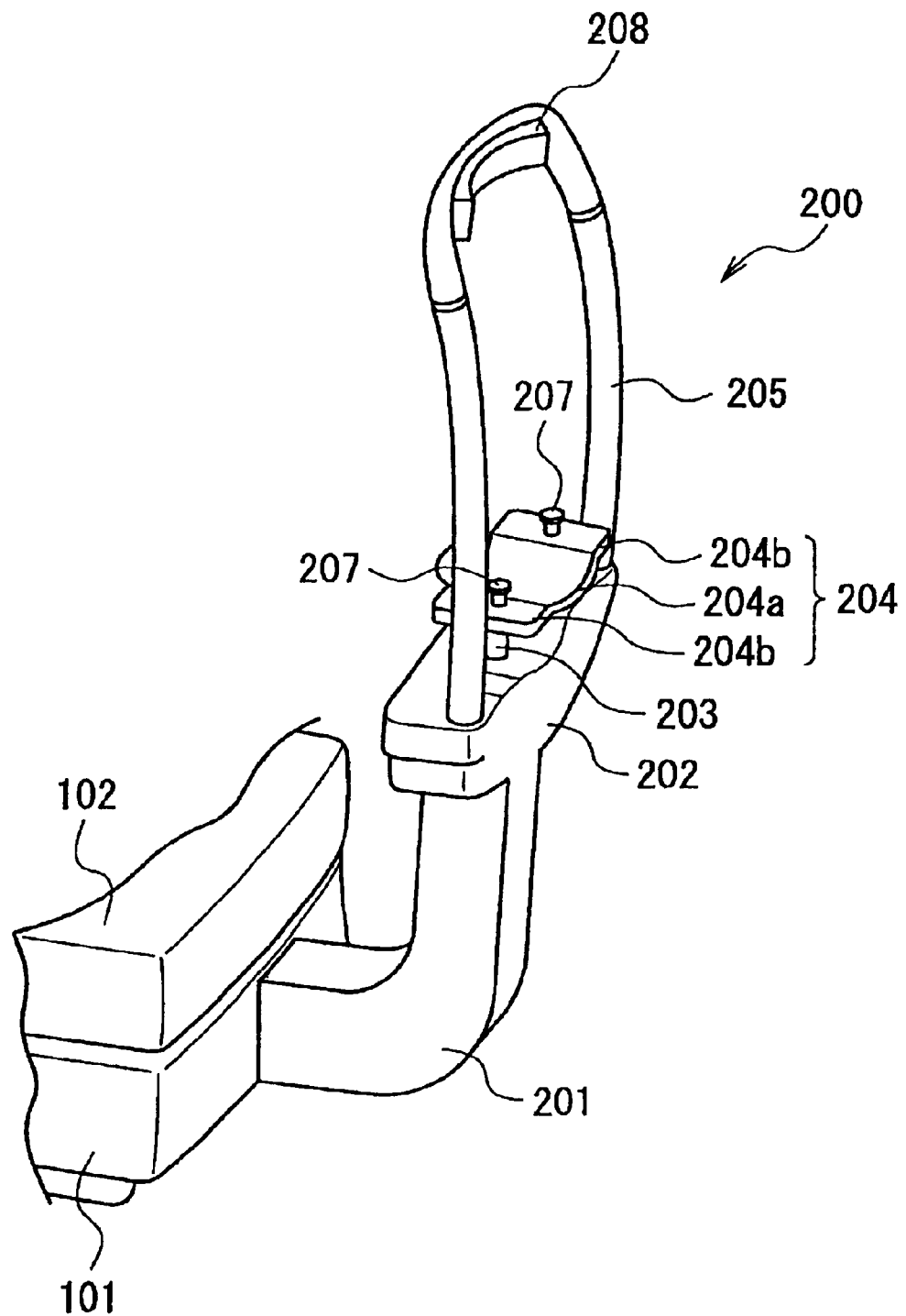
FIG. 14 is a perspective view of a face fixing device shown in FIG. 12.
Figure 15:
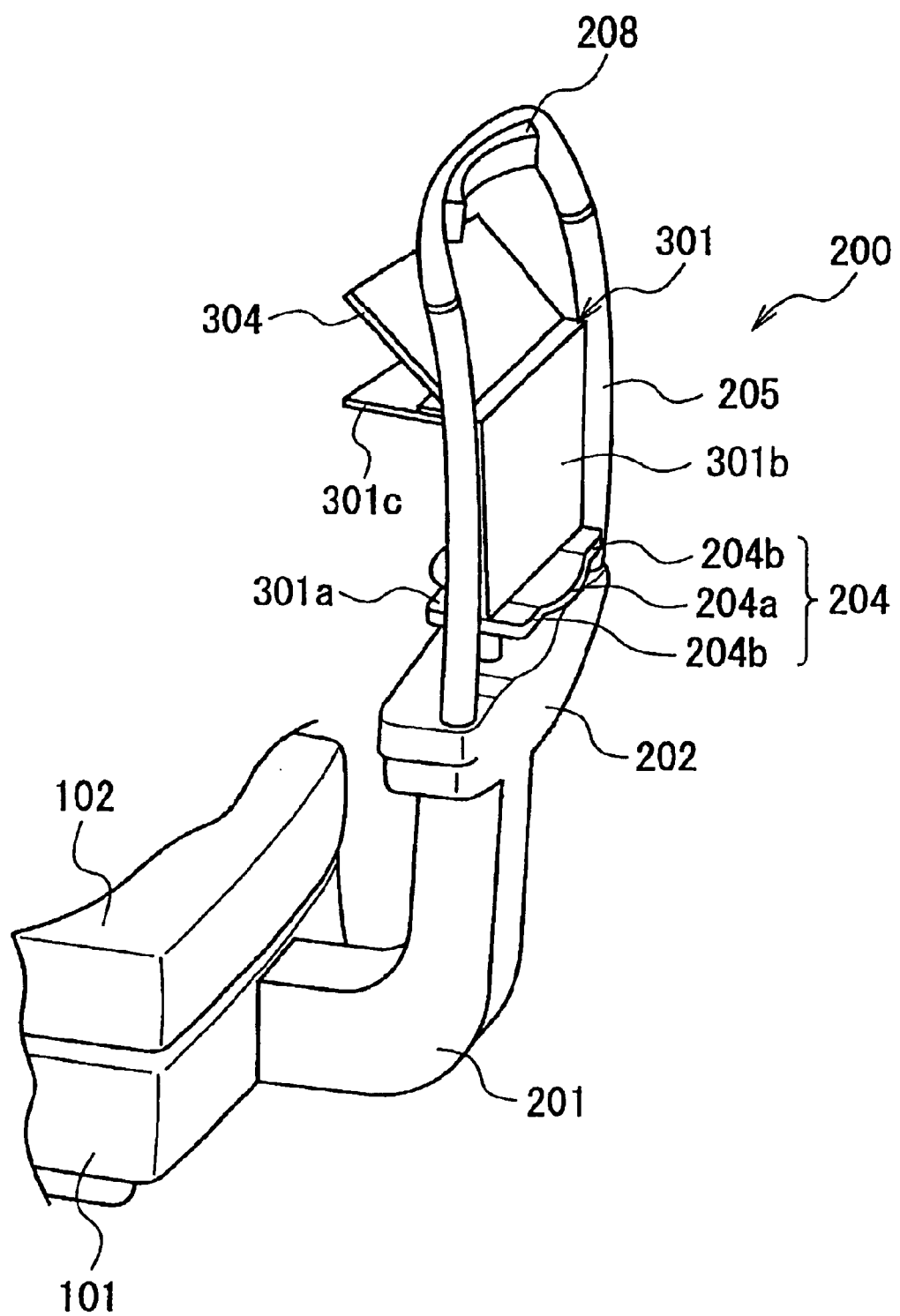
FIG. 15 is a perspective view with a contact lens measuring attachment attached to a jaw rest shown in FIG. 14.
Figure 16:
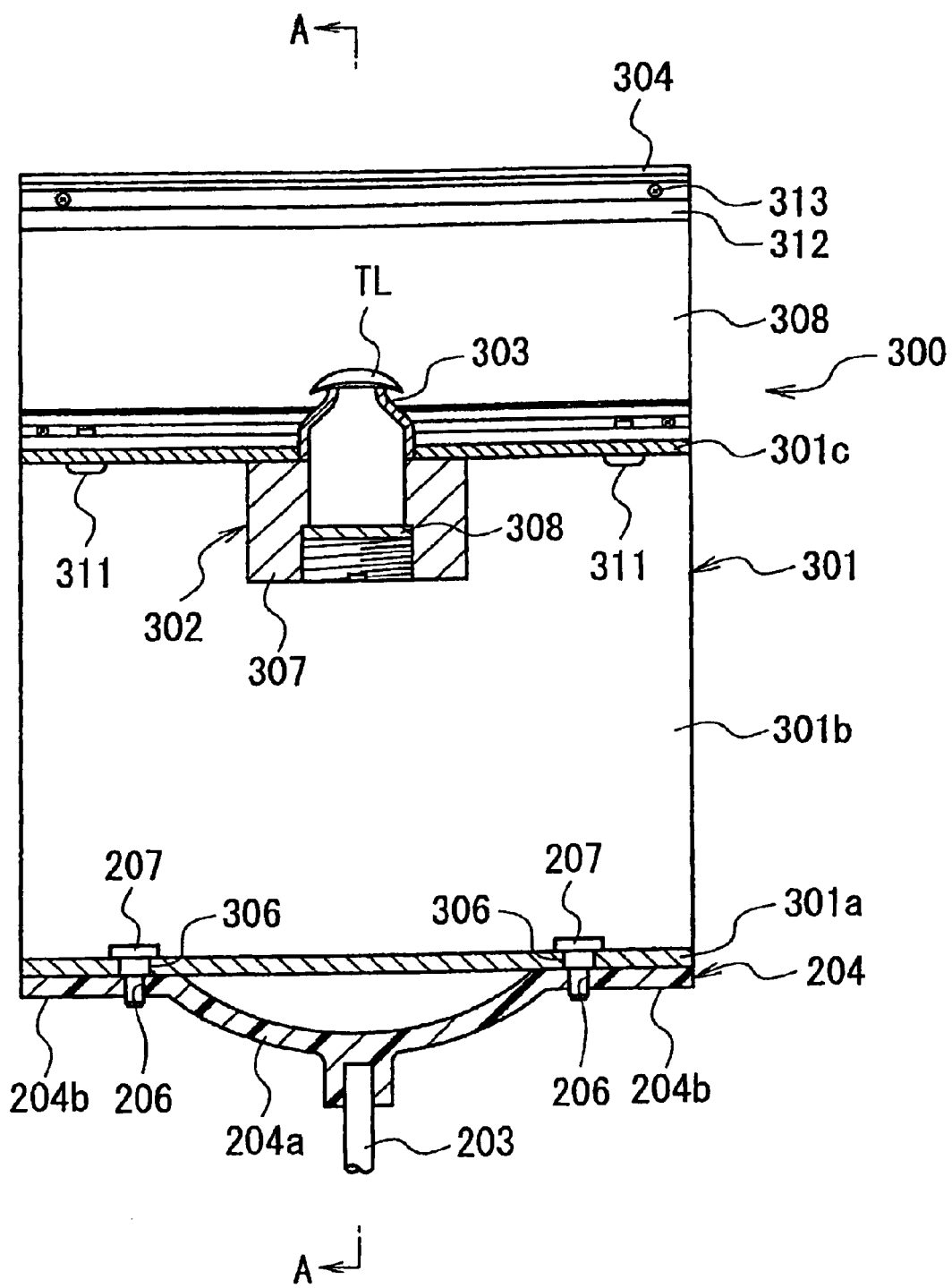
FIG. 16 is a partially sectional view of the attachment shown in FIG. 15.
Figure 17:
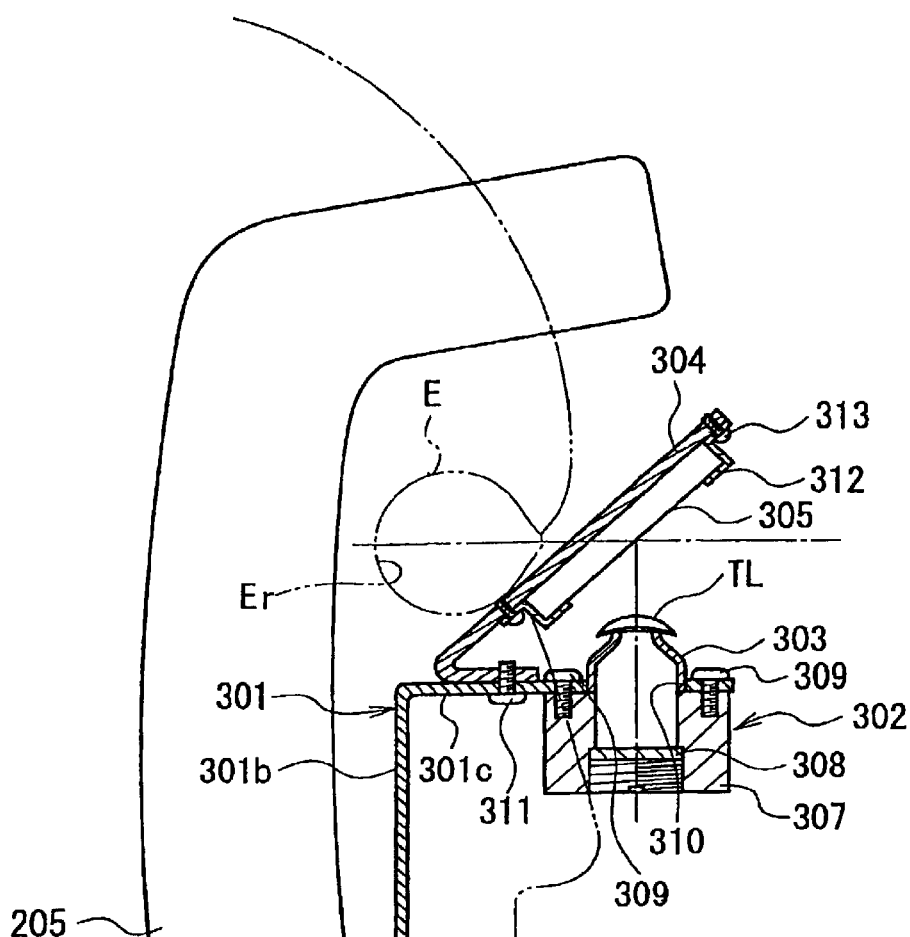
FIG. 17(a) is a sectional view taken on line A—A in FIG. 16.
FIG. 17(d) is an explanatory diagram showing a state of rotation of a ring pattern beam on a surface of a soft contact lens.
Figure 17:
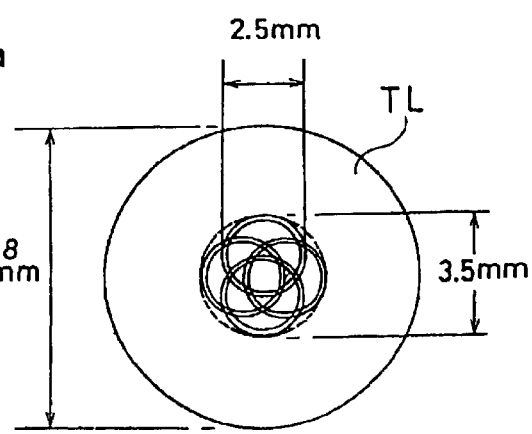
Figure 1:
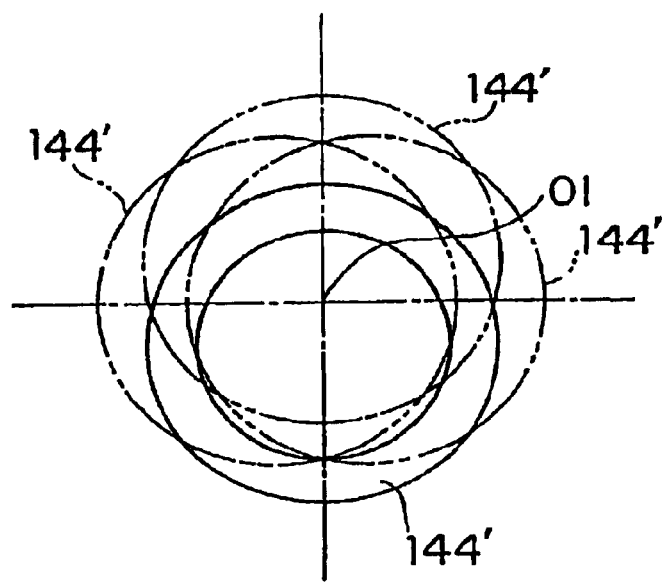

FIGS. 12 to 23 illustrate a second embodiment of the present invention. In this second embodiment, a face fixing device 200 is mounted to an ophthalmic refractive power measuring apparatus 100 and an attachment 300 for contact lens measurement, which is shown in FIGS. 15 to 17, is attached to the face fixing device 200, thereby permitting the ophthalmic refractive power measuring apparatus 100 to make such a measurement of the soft contact lens TL as described above.

In FIGS. 12 and 13, the numeral 101 denotes a fixed base of the ophthalmic refractive power measuring apparatus 100, numeral 102 denotes a movable base which is mounted on the fixed base 101 so as to be movable in both longitudinal and transverse directions, and numeral 103 denotes a joy stick lever for moving the movable base 102 in both longitudinal and transverse directions. On the movable base 102 is mounted a case 104 which incorporated a three-dimensional drive unit (not shown), and on the case 104 is mounted an apparatus body 105 which incorporates a refractive power measuring optical system. The refractive power measuring optical system is adapted to be given in three-dimensional directions by the three-dimensional drive unit (not shown) disposed within the case 104.

The three-dimensional drive unit 104 can be operated by both joy stick lever 103 and an arithmetic and control circuit (arithmetic and control means) (not shown). For this construction there may be adopted a known construction and therefore a detailed explanation thereof will here be omitted.

A TV monitor (display unit) 104a is mounted on a back side of the case 104.

<Face Fixing Device 200>

The face fixing device (face fixing means) 200 has a support member 201 which is attached to a transversely central part of a front end side of the fixed base 101, as shown in FIGS. 14 and 15. The support member 201 has L-shaped side faces and extends vertically, as shown in FIGS. 13 to 15. A jaw support portion 202, which extends right and left, is integral with an upper end of the support member 201.

The face fixing device 200 has a jaw rest support shaft 203 which is connected to a jaw rest support portion 202 in a vertically movable manner, a jaw rest 204 secured to an upper end of the jaw rest support shaft 203, and a forehead pad support frame 206 which extends vertically in an inverted U shape and both ends of which are secured onto both ends of the jaw rest support shaft 203.

The jaw rest support shaft 203 is positioned centrally in the transverse direction of the jaw rest support portion 202 and can be adjusted its vertical movement by a drive means such as a drive motor (not shown). For this construction there may be adopted a known construction and therefore an explanation thereof will here be omitted. The jaw rest 204 comprises a recess 204a for resting the jaw thereon (for jaw support) positioned centrally in the transverse direction and a pair of horizontal portions 204b positioned right and left of the recess 204a. Pin mounting holes 206 ere formed in the horizontal portions 204b respectively, as shown in FIG. 16.

The face fixing device 200 is further provided with a pair of position restricting pins 207 thread engaged in the pin mounting holes 206 and projecting upward and a forehead pad 208 attached to an upper end of the forehead pad support frame 205. The face fixing device 200 can also be mounted by press-fitting tho position restricting pins 207 into the pin mounting holes 206.

<Attachment 300 for contact lens measurement>

As shown in FIGS. 16 to 17, the attachment 300 has a part mounting plate 301, a model eye 302, a lens rest 303, a mirror mounting plate 304, and a reflecting mirror 305.

The part mounting plate 301 comprises a horizontal, lower mounting plate portion 301a, a plate portion 301b which extends upward substantially vertically from a front edge of the lower mounting plate portion 301a, and an upper mounting plate portion 301c which extends horizontally backward from an upper end of the plate portion 301b. On the right and left sides of the lower mounting plate portion 301a are formed pin insertion holes 306 respectively at the same spacing as that of the pin mounting holes 206 of the jaw rest 204, as shown in FIG. 16.

As shown in FIGS. 16 and 17(a), the model eye 302 has a cylindrical body 307 extending vertically and a reflecting mirror 308 disposed within a lower end portion of the body 307. An upper end portion of the body 307 is fixed with screws 309 to the underside of a transversely central part of the upper mounting plate portion 301c. Moreover, a lens rest mounting hole 310 concentric with the body 307 and larger in diameter than the inside diameter of the body 307 is formed in the upper mounting plate portion 301c. A lower end portion of the lens rest 303 is fitted in the lens rest mounting hole 310. The lens rest 303 may be fixed by bonding to the body 307 and the lens rest mounting hole 310. The lens rest 303 may be fixed by bonding or threadedly to the body 307 or the lens rest mounting hole 310.

Further, the mirror mounting plate 304 is fixed with screws 311 to an upper portion of the upper mounting plate portion 301c in a 45° inclined state backward. The reflecting mirror 305 is fixed to a lower surface of the mirror mounting plate 304 through a bracket 312 and screws 313. A central part of the reflecting mirror 305 faces the lens rest 303.

By inserting the position restricting pins 207 into the pin insertion holes 306 of the attachment 300 having such a construction and by subsequently bringing the pins 207 into threaded engagement in the pin mounting holes 206 of the jaw rest 204, the attachment 300 can be mounted to the jaw rest 204.

<Refractive Power Measuring Optical System>

Such a refractive power measuring optical system as shown in FIG. 18(A) is incorporated within the apparatus body 105. In FIG. 18(A), the numeral 110 denotes a target projecting optical system which projects a target on the eyeground Er to fix and fog the eye E to be inspected, numeral 120 denotes a viewing optical system for viewing a front eye portion Ef of the eye E, numeral 180 denotes a scale projecting optical system for projecting an aiming scale on a light receiving element S, numeral 140 denotes a pattern beam projecting optical system for projecting a pattern beam on the eyeground Er which pattern beam is for measuring a refractive power of the eye E, ad numeral 150 denotes a light receiving optical system which causes a light beam reflected from the eyeground Er to be received by the light receiving element S.

The target projecting optical system 110 comprises light source 111, collimator lens 112, target plate 113, relay lens 114, mirror 115, relay lens 116, dichroic mirrors 117 and 118, and objective lens 119.

Visible light emitted from the light source 111 is collimated into a parallel beam by the collimator lens 112 and then passes through the target plate 113. On the target plate 113 is provided a target for firing and fogging the eye E. The target beam passes through the relay lens 114 and is reflected by the mirror 115, then passes through the relay lens 116 and is reflected by the dichroic mirror 117, then is conducted to a main optical axis O1 of the apparatus body, passes through the dichroic mirror 118 and is thereafter conducted to the eye E through the objective lens 119.

The light source 111, collimator lens 112, and target plate 113 are held by a lens barrel 110a and unitized so as to be movable along an optical axis O2 of the target projecting optical system 110 to fix and fog the eye E. The lens barrel 110a is moved forward and backward along the optical axis O2 by means of a pulse motor PM1.

The viewing optical system 120 comprises light source 121, objective lens 119, dichroic mirror 118, relay lens 122, diaphragm 123, mirror 124, relay lens 125, dichroic mirror 126, imaging lens 127, and light receiving element S. In measuring a refractive characteristic of the soft contact lens, the light receiving element S is also used as a scattered light receiving portion.

The light beam emitted from the light source 121 directly illuminates the front portion Ef of the eye E to be inspected. The light beam reflected by the front eye portion Ef passes through the objective lens 119 and is reflected by the dichroic mirror 118, then passes through the relay lens 122 and at the same time passes through the diaphragm 123, then is reflected by the mirror 124, thereafter passes through the relay lens 125 and dichroic mirror 126, and is imaged on the light receiving element S by the imaging lens 127.

The scale projecting optical system 130 comprises light source 131, collimator lens 132 provided with an aiming scale, relay lens 133, dichroic mirror 118, relay lens 122, diaphragm 123, mirror 124, relay lens 125, dichroic mirror 126, imaging lens 127, and light receiving element S.

Light beam emitted from the light source 131 is made into an aiming scale beam (parallel beam) when passing through the collimator lens 132, then passes through the relay lens 133, dichroic mirror 118, relay lens 122 and diaphragm 123 and is reflected by the mirror 124, further passes through the relay lens 125 and dichroic mirror 126 and is imaged on the light receiving element S by the imaging lens 127.

For example, a two-dimensional area CCD is used as the light receiving element S. A front eye portion image is conducted to a monitor (not shown) by means of the viewing optical system 120 and is displayed thereon. At the same time, an image based on the aiming scale is displayed on the monitor. The inspector performs operation for vertical and transverse alignment of both eye E and apparatus body so that the front eye portion image displayed on the monitor approaches the aiming scale image. The inspector also performs operation for longitudinal alignment. In measuring a refractive power after the operation for alignment, the light sources 121 and 131 are turned OFF, or a shutter or the like is provided in the optical path extending from the dichroic mirror 118 to the dichroic mirror 126 to inhibit the reception of light in the light receiving element S.

The pattern beam projecting optical system 140 comprises light source 141, collimator lens 142, conical prism 143, ring target plate 144, relay lens 145, mirror 146, relay lens 147, prism with hole 148, optical axis deflecting prism 149 as a deflector member, dichroic mirrors 117 and 118, and objective lens 119. The light source 141 and the ring target plate 144 are optically conjugated with each other and the ring target plate 144 and a pupil Ep of the eye E are disposed optically conjugated positions.

Light beam emitted from the light source 141 is made into a parallel beam by the collimator lens 142. The parallel beam passes through the conical prism 143 and is conducted to the ring target plate 144, then passes through a ring-like pattern portion formed on the ring target plate 144 and becomes a pattern beam. The pattern beam passes through the relay lens 145, then is reflected by the mirror 146, passes through the relay lens 147 and is reflected along the main optical axis O1 by the prism with hole 148, then passes through the dichroic mirrors 117 and 118 while being obliquely deflected and offset from the main optical axis O1 by the optical axis deflecting prism 149, and is thereafter imaged on the eyeground Er by the objective lens 119.

The optical axis deflecting prism 149 is adapted to be rotated (see arrow) at high speed about the main optical axis O1 by means of the pulse motor PM2. With this high-speed rotation, the pattern beam projected on the eyeground Er circles in an eccentric state about the main optical axis O1, as shown in FIG. 19.

The light receiving optical system 150 comprises objective lens 119, dichroic mirrors 118 and 117, optical axis deflecting prism 149, hole 148a of the prism with hole 148, relay lens 151, mirror 152, relay lens 153, mirror 154, focusing lens 155, mirror 156, dichroic mirror 126, imaging lens 127, and light receiving element S.

The focusing lens 155 is movable along optical axes O3 and O4 of the optical systems 140 and 150 together with the light source 141, collimator lens 142, conical prism 143 and ring target plate 144.

The light beam which has been conducted to the eyeground Er by the pattern beam projecting optical system 140 and reflected by the eyeground is condensed by the objective lens 119, then passes through the dichroic mirrors 118 and 117 and is conducted to the optical axis deflecting prism 149. The light beam which has passed through the optical axis deflecting prism 149 is conducted to the hole 148a of the prism with hole 148 from the same portion centered on the main optical axis O1 in accordance with the principle of beam retogression and passes through the hole 148a.

The reflected pattern beam having passed through the hole 148a passes through the relay lens 151 and is reflected by the mirror 156, then passes through the relay lens 153 and is reflected by the mirror 154, further passes through the focusing lens 155 and is reflected by the mirror 156 and the dichroic mirror 126, and a pattern image is formed on the light receiving element S through the imaging lens 127.

The light receiving element S and the eyeground Er are conjugated with each other and the ring target plate 144 is conjugated with the eyeground Er.

A video signal (received light signal; measured signal) provided from the light receiving element S is fed to an arithmetic and control circuit 160, as shown in FIG. 18(B). On the basis of the video signal provided from the light receiving element S the arithmetic and control circuit (calculation means) 160 determines a refractive power of the eye to be inspected and makes control to display the thus-determined refractive power on a TV monitor 149a.

Moreover, the arithmetic and control circuit 160 controls the operation of the pulse motor PM1 to let the lens barrel 110a move forward and backward along the optical axis O2. Likewise, the arithmetic and control circuit 160 controls the operation of the pulse motor PM2 to let the prism 149 rotate at high speed around the optical axis O1. Besides, the arithmetic and control circuit 160 controls the lightning of the light sources 111, 131 and, 141.

Further, the arithmetic and control circuit 160 makes control to let plural pattern images 144" on the light receiving element S be stored in a storage medium 161 such as a frame memory.

[Operation]

The following description is now provided about measurement of the soft contact lens TL using the ophthalmic refractive power measuring apparatus 100 and attachment 300 both constructed as above.

(1) Measuring an Ophthalmic Refractive Power by the Ophthalmic Refractive Power Measuring Apparatus 100

<Alignment>

Before starting the measurement, the light sources 111, 121 and 131 are tub ed ON by the arithmetic and control circuit 160 and the eye E to be inspected is fixed, further, an alignment operation is performed for both eye E and apparatus body.

In this case, a visible light emitted from the light source 111 is made into a parallel beam by the collimator lens 112. The parallel beam passes through the target plate 113, forming a target beam of the target plate 113. The target beam is projected on the eye E through the relay lens 114, mirror 115, relay lens 116, dichroic mirrors 117, 118 and objective lens 119. The eye E is allowed to view the target light. At this time, the light source 111, collimator lens 112 and target plate 113, which are unitized, are moved along the optical axis O2, allowing the eye E-fixed target beam to be fogged to create a state in which the eye E views a remote point.

On the other hand, light beam emitted from the light source 121 illuminates the front portion Ef of the eye E directly. Then, the light beam reflected by the front eye portion Ef passes through the objective lens 119, dichroic mirror 118, relay lens 122, diaphragm 123, mirror 124, relay lens 125, dichroic mirror 126, and is imaged on the light receiving element S by the imaging lens 127. Light beam emitted from the light source 131 in the scale projecting optical system 130 is made into an aiming scale beam (parallel beam) while passing through the collimator lens 132. Thereafter, the aiming scale beam passes through the relay lens 133, dichroic mirror 118, relay lens 122 and diaphragm 123 and is reflected by the mirror 124, then passes through the dichroic mirror 126 and is imaged on the light receiving element S by the imaging lens 127.

In this way a front eye portion image is conducted to the light receiving element S by the viewing optical system 120 and is formed thereon, and also formed thereon is an image based on the aiming scale. A video signal provided from the light receiving element S is fed to the monitor 104a and a front eye portion image E', as well as an image based on the aiming scale TS, are displayed on the monitor 104a. The inspector operates the joy stick lever 103 to effect alignment in vertical and transverse directions for both eye E and apparats body 105 so that the front eye portion image E' displayed on the monitor 104a approaches the aiming scale image TS. The inspector also performs a longitudinal alignment operation for the front eye portion E' displayed on the monitor 104a.

<Measurement>

When the operation for alignment is over, the arithmetic and control circuit 160 turns OFF the light sources 121 and 131 so that the light from the light sources 121 and 131 may not be projected on the light receiving element S. In this state, the arithmetic and control circuit 160 turns ON the light source 141 in the pattern beam projecting optical system 140.

Light beam emitted from the light source 141 in the pattern beam projecting optical system is made into a parallel beam by the collimator lens 142. Then, the parallel beam passes through the conical prism 143 and is conducted to the ring target plate 144, then passes through a ring-shaped pattern portion formed on the ring target plate 144 and is thereby made into a pattern beam. This pattern beam passes through the relay lens 145 and is thereafter reflected by the mirror 146, then passes through the relay lens 147 and is reflected along the main optical O1 by the prism with hole 148, further, passes through the dichroic mirrors 117 and 118 while being obliquely deflected and offset from the main optical axis O1 by means of the optical axis deflecting prism 149, and is then imaged on the eyeground Er by the objective lens 119.

In this case, the optical axis deflecting prism 149 is rotated (see arrow) at high speed about the main as O1 by the pulse motor PM2 whose operation is controlled by the arithmetic and control circuit 160. With this high-speed rotation, the pattern image projected on the eyeground Er circles eccentrically around the main axis O1, as shown in FIG. 19.

The light beam which has been conducted to the eyeground Er by the pattern beam projecting optical system 140 and reflected by the eyeground is condensed by the objective lens 119, then passes through the dichroic mirrors 118 and 117 and is conducted to the optical axis deflecting prism 149. The light beam which has passed through the optical axis deflecting prism 149 is conducted to the hole 148a of the prism with hole 148 from the same portion centered on the main optical axis O1 in accordance with the principle of beam retrogression and passes through the hole 148a.

The reflected pattern beam having passed through the hole 148a passes through the relay lens 151 and is reflected by the mirror 152, then passes through the relay lens 153 and is reflected by the mirror 154, further passes through the focusing lens 155 and is reflected by the mirror 156 and the dichroic mirror 126, and a pattern image is formed on the light receiving element S by the imaging lens 127.

In this projection of pattern image 144', if the inspector pushes a measurement start switch (not shown), the arithmetic and control circuit 160 makes control so that plural pattern images 144" on the light receiving element S, which are based on pattern images 144' formed at arbitrary positions of circumferences projected on the eyeground Er, are stored in the storage medium 161 such as a frame memory.

For example, as shown in FIGS. 21(A) to (F), if pattern images 144 corresponding to pattern images 144' offset at ring center O1' from the optical axis O1 are stored in the storage medium as patterns 144" on the light receiving element S, then in the states shown in FIGS. 21(A), D), (E) and (F), detected peak positions Q1 and Q2 are in agreement with an actual central position of image width, whereas in the states shown in FIGS. 21(B) and (C), peak positions Q3 and Q4 are offset from the actual central position of image width under the influence of a trouble 109.

Figure 20:
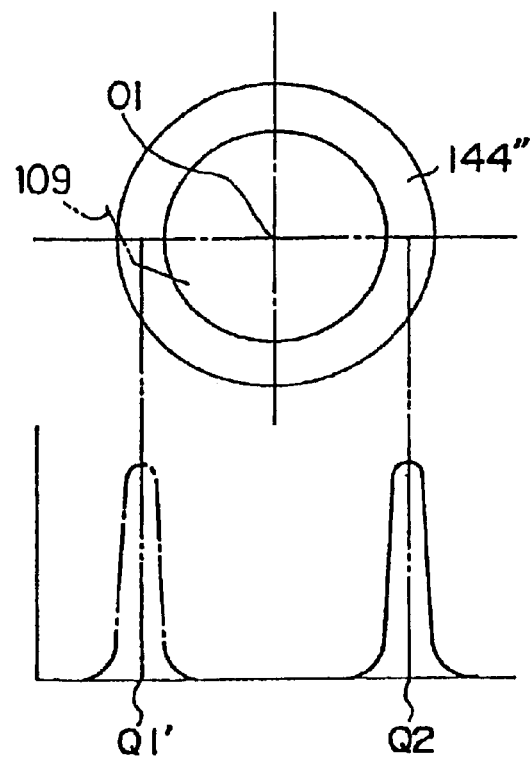
FIG. 20 is an explanatory diagram showing a relation between a pattern image formed on a light receiving element in the optical system shown in FIG. 18 and peak positions.
Figure 21:
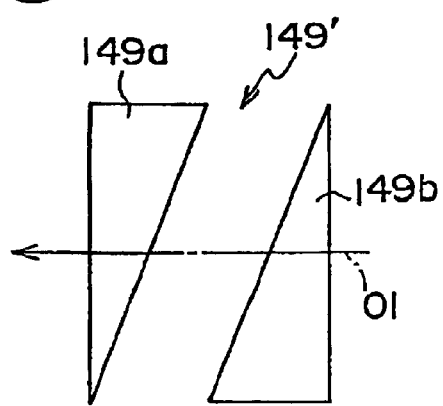
FIG. 21 shows a modified example of a deflecting member, in which (A) is an explanatory diagram of a rotary prism in a non-deflected state of light beam and (B) is an explanatory diagram of the rotary prism in a deflected state of light beam.
Figure 21:
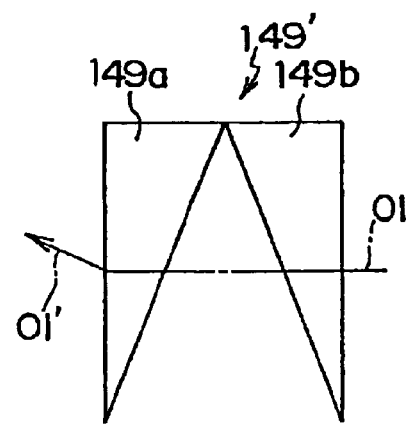
Figure 23:
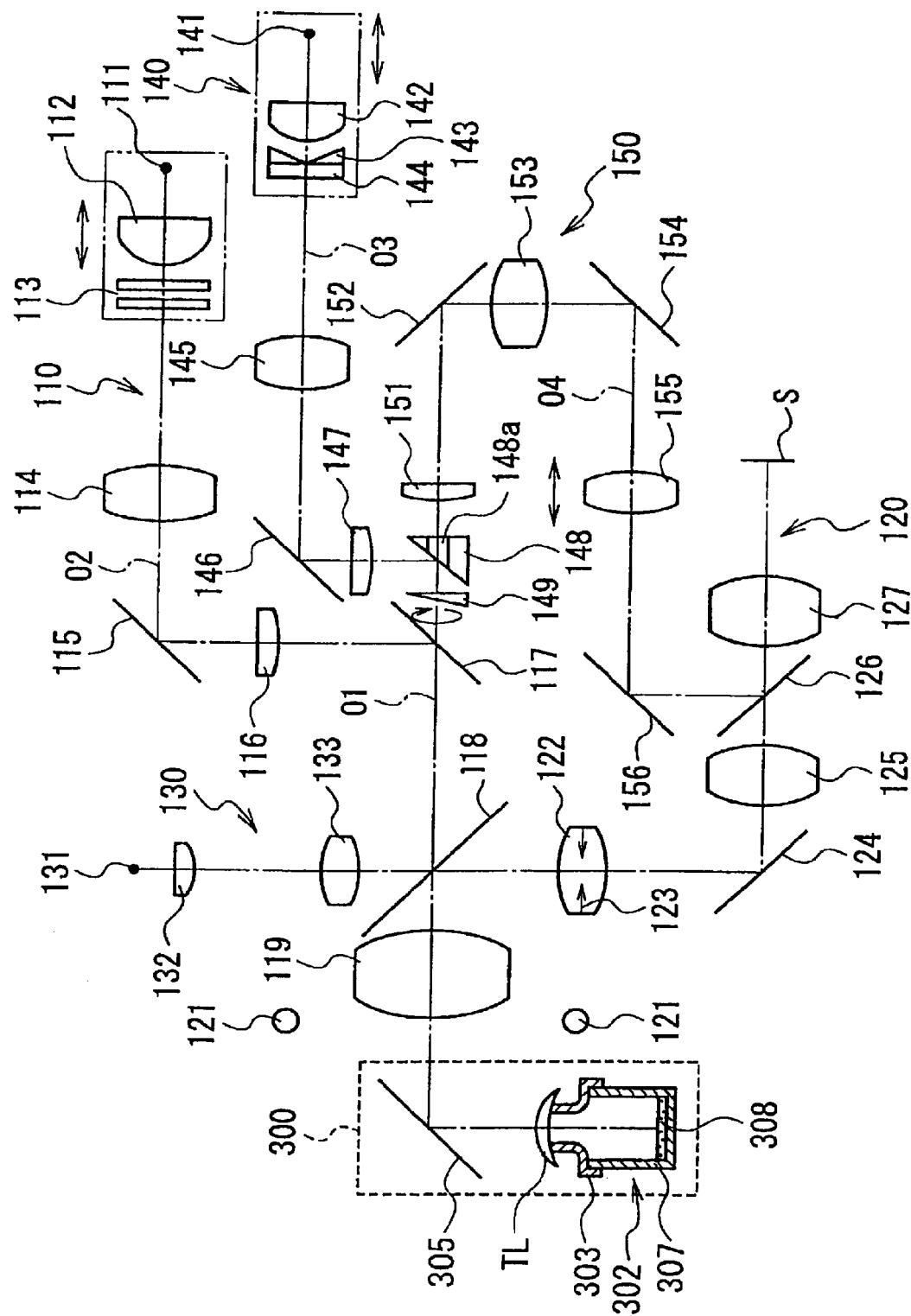
FIG. 23 is an explanatory diagram showing an example of contact lens measurement using the ophthalmic refractive power measuring apparatus shown in FIG. 18.

If the peak positions Q1, Q3 and Q4 are averaged by the number of times of storage, there can be calculated a peak position Q1' which is close to the actual central position of image width, as shown in the graph of FIG. 20. Further, by calculating a center-to-center distance in the image width in accordance with position information of the peak positions Q1' and Q2, it is possible to measure an ophthalmic refractive power (the method for the measurement is known and is therefore omitted). This calculation is performed by the arithmetic and control circuit 160.

<Others>

In the above second embodiment the optical axis deflecting prism 149 is used as a deflecting member, but for example as shown in FIG. 22(A), a rotary prism 149' having two prisms 149a and 149b capable of rotating independently and synchronously may be used as a deflecting member aid, for example as shown in FIG. 22(B), the whole of the rotary prism 149' may be rotated about the optical axis O1 while allowing one prism 149b to rotate about the optical axis O1.

In this case, a deviation in output angle from the optical axis O1 can be adjusted by adjusting independent rotations of the prisms 149a and 149b, thus affording a wider application range than in the use of the optical axis deflecting prism 149.

Thus, the range which can be influenced by the trouble 109 on the circumferential track of each pattern image 144' is very small as compared with the range not influenced by the trouble 109. In the case of the trouble 109 referred to as an example, such very small ranges correspond to the ranges defined by the tracks shown in FIGS. 21(B) and (C), and the other ranges cab be said identical with normal eye ranges. Therefore, the larger the number of times the peak positions are stored in the storage medium, the higher the possibility of inputting eyeground information on the portion not affected by the trouble 109. And by averaging the results of measurement of center-to-center distances in the width there can be obtained a measurement result which is highly reliable to such an extent as permits ignoring a deviation caused by the trouble 109.

The position of the trouble 109 on the eyeground Er differs depending on the person to be inspected. Therefore, if the pattern image 144' is merely projected on a deviated position (deflected position), it is likely for a trouble 109 or the like to be present at the deviated position and there is a fear that the result of measurement may be erroneous. In the present invention, however, since the pattern image is rotated and storage is made plural times into the storage medium, the possibility of inputting pattern images 144' affected by the trouble 109 decreases and it is possible to enhance the reliability of the measurement result.

Although the pattern image 144' is projected at a position deviated from the optical axis O1, the eye E to be inspected and the apparatus body are maintained in a predetermined certain relation by alignment operation, with no likelihood of impeding the reliability of measured data.

Although in this embodiment the optical axis deflecting prism 149 is inserted in a shared portion of both pattern beam projecting optical system 140 and light receiving optical system 150, no limitation is made thereto, but, for example, there may be adopted a construction wherein an optical axis deflecting prism of the same type is disposed in an unshared portion of each optical systems so that rotational angles of both such optical axis deflecting prisms are always equal to each other. With this construction, there can be obtained the same function and effect as above.

(2) Measuring the Refraction of Soft Contact Lens TL

For measuring the refractive power of the soft contact lens TL with use of the ophthalmic refractive power measuring apparatus 100 constructed as above, the attachment 300 having the model eye 302 is attached to the jaw rest. In this case, first the position restricting pins 207 are moved from the pin mounting holes 206 of the jaw rest 204 provided in the face fixing device 200. Next, the position restricting pins 207 are inserted into the pin insertion holes 306 of the attachment 300 and are then threadedly engaged in the pin mounting holes 206 of the jaw rest 204.

In this way the attachment 300 is attached to the jaw rest 204, as shown in FIGS. 15 to 17. As a result, the model eye 302 is mounted on the jaw rest 204 and the objective lens 119 faces the model eye 302 through the reflecting mirror 305 as in FIG. 23.

In this state the soft contact lens TL is put on the lens rest 204 of the attachment 300 as in FIGS. 16 and 17. Next, the light sources 121 and 131 are turned ON through the arithmetic and control circuit 160 and an alignment operation for both apparatus body 105 and model eye 302 is performed by operating the joy stick lever 103 in the same manner as the alignment operation for both apparatus body 105 and eye Er. In this case, it is not necessary to turn ON the light source 111.

When this alignment operation is over, the arithmetic and control circuit 160 turns OFF the light sources 121 and 131 so that the light from both light sources may not be projected on the light receiving element S. In this state the arithmetic and control circuit 160 turns ON the light source 141 in the pattern beam projecting optical system 140.

The light beam emitted from the light source 141 in the pattern beam projecting optical system 140 is made into a parallel beam by the collimator lens 142. The parallel beam passes through the conical prism 143 and is conducted to the ring target plate 144, then passes through a ring-like pattern portion formed on the ring target plate 144 and becomes a pattern beam.

The pattern beam passes through the relay lens 145, then is reflected by the mirror 146, passes through the relay lens 147 and is reflected along the main optical axis O1 by the prism with hole 148, then passes through the dichroic mirrors 117 and 118 while being obliquely deflected and deviated from the main optical axis O1 by the optical axis deflecting prism 149, then is projected on the surface of the soft contact lens TL through the objective lens 119 and reflecting mirror 305, passes through the soft contact lens TL and enters the body 307 of the model eye 302, then is projected and imaged on the reflecting mirror 308 disposed within the lower end portion of the body 307 and is reflected by the mirror.

At this time the optical axis deflecting prism 149 is rotated (see arrow) at high speed about the man optical is O1 in the same manner as above, and with this high-speed rotation, the pattern beam projected on both soft contact lens TL and eyeground Er circles eccentrically about the main optical axis O1, as shown in FIG. 19.

The pattern beam is conducted to the reflecting mirror 308 in the model eye 302 by the pattern beam projecting optical system 140 and the beam reflected by the reflecting mirror 308 is condensed by the objective lens 119 through the contact lens TL and reflecting mirror 305, then passes through the dichroic mirror 118 and 117 and is conducted to the optical axis deflecting prism 149. The light beam which has passed through the optical axis deflecting prism 149 is conducted to the hole 148a of the prism with hole 148 from the same portion centered on the main optical axis O1 in accordance with the principle of beam retrogression and passes through the hole 148a.

The reflected pattern beam having passed through the hole 148a passes through the relay lens 151 and is reflected by the mirror 152, then passes through the relay lens 153 and is reflected by the mirror 154, further passes through the focusing lens 155 and is reflected by the mirror 156 and the dichroic mirror 126, and a pattern image is formed on the light receiving element S through the imaging lens 127.

As to the radius of gyration of the ring-like pattern beam on the surface of the soft contact lens TL, it is convenient for the measurement to set the said radius of gyration in such a manner that if the diameter of the soft contact lens TL is 8.8 mm and that of the ring-like pattern beam is 2.5 mm, the diameter of gyration on the surface of the soft contact lens TL is 3.5 mm, as shown in FIG. 17(b).

In the projection of the pattern image 144', if the inspector pushes the measurement start switch (not shown), the arithmetic and control circuit 160 makes control so that plural pattern images 144" on the light receiving element S, which are based on pattern images 144' formed at arbitrary positions in the circumference projected on the reflecting mirror 308 in the model eye 302, are stored in a storage medium such as a frame memory.

Also in this case, as shown in FIG. 20, an ophthalmic refractive power can be measured by calculating a center-to-center distance in the width in accordance with positional information on peak positions Q1' and Q2.

Also in this measurement using the ophthalmic refractive power measuring apparatus 100, the same measurements and calculations as in the (i) start of measurement (a large amount of liquid holding state), (ii) intermediate stage of measurement (a compatibility state) and (iii) latter stage of measurement (a dried state), which are conducted in the first embodiment, are carried out though the arithmetic and control circuit 160. In this way there can be attained a more accurate measurement.

According to this construction, even if the degree of wet of the soft contact leas TL is not uniform, it is possible to diminish the influence thereof and measure the optical characteristics S, C, A. Further, even when the surface or the back of the soft contact lens TL is flawed or stained or even if the lens TL is distorted, the optical characteristics S, C, A can be measured while diminishing the influence thereof.

In measuring the optical characteristic values of the soft contact lens TL, it is desirable that the optical axis deflecting prism 149 be disposed at a position not conjugated with the back side (the side which contacts the cornea of the eye to be inspected) of the soft contact lens.

Although in the second embodiment it is the soft contact lens TL that is measured for optical characteristics, it is also possible to measure optical characteristics of a hard contact lens. In this case, even if the hard contact lens is stained or flawed relatively heavily, it is possible to measure optical characteristics thereof accurately without being influenced by such stain or flaw. In case of measuring optical characteristics of a hard contact lens, it is not necessary to determine optical characteristics in a time series manner.

[Third Embodiment]

Although the apparatus and method described in the above second embodiment measures the refractive power of t the soft contact lens TL with use of the ophthalmic refractive power measuring apparatus 100, a limitation is not always made thereto. For example, the refractive power measurement for the soft contact lens TL may be made using such a dedicated lens refractive power measuring apparatus 400 as shown in FIG. 24.

Figure 24:
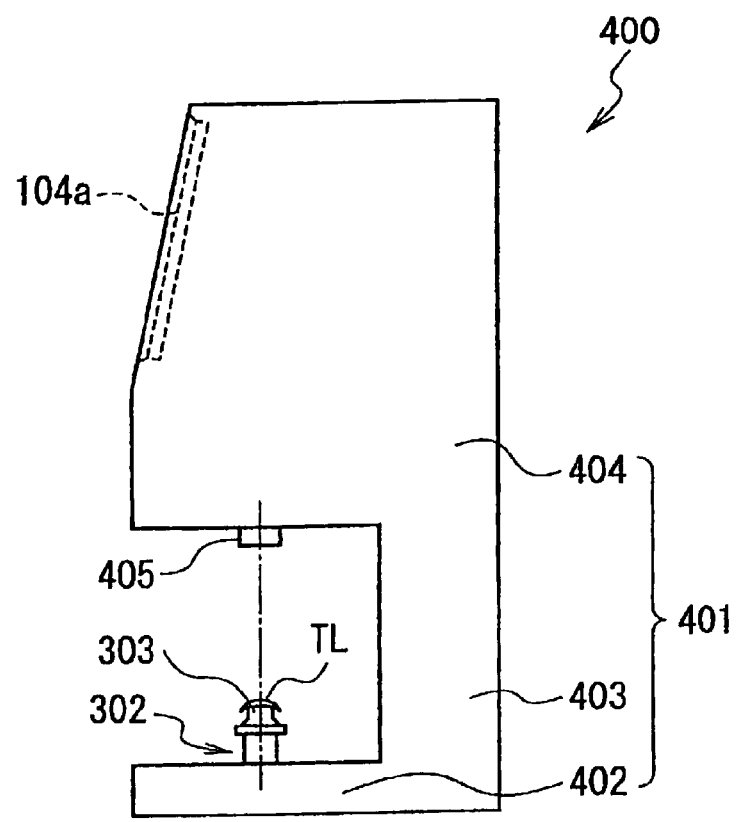
FIG. 24 is a side view of an apparatus for measuring a refractive power of a contact lens according to a third embodiment of the present invention.

The lens refractive power measuring apparatus 400 has an apparatus body 401 shown in FIG. 24. The apparatus body 401 comprises a base portion 402, an upwardly extending support portion 403 which is integral with a rear edge of the base portion 402, and a housing portion 404 positioned above the base portion 402 and integral with an upper portion of the support portion 403. In the measuring optical system described in the second embodiment, both pattern beam projecting optical system 140 and light receiving optical system 150 are incorporated within the housing portion 404. A lens barrel 405 which receives therein the objective lens 119 used in the measuring optical system is projected downward from a lower surface of the housing portion 404. On a front side of the housing portion 404 is mounted a TV monitor television 104a.

Further, a model eye 302 is disposed below the lens barrel 405. The model eye 302 is mounted upward on the base portion 402 so that the axis thereof is aligned with the optical axis O1 of the objective lens 119. A lens rest 204 is attached to an upper end portion of the model eye 302.

Figure 25:
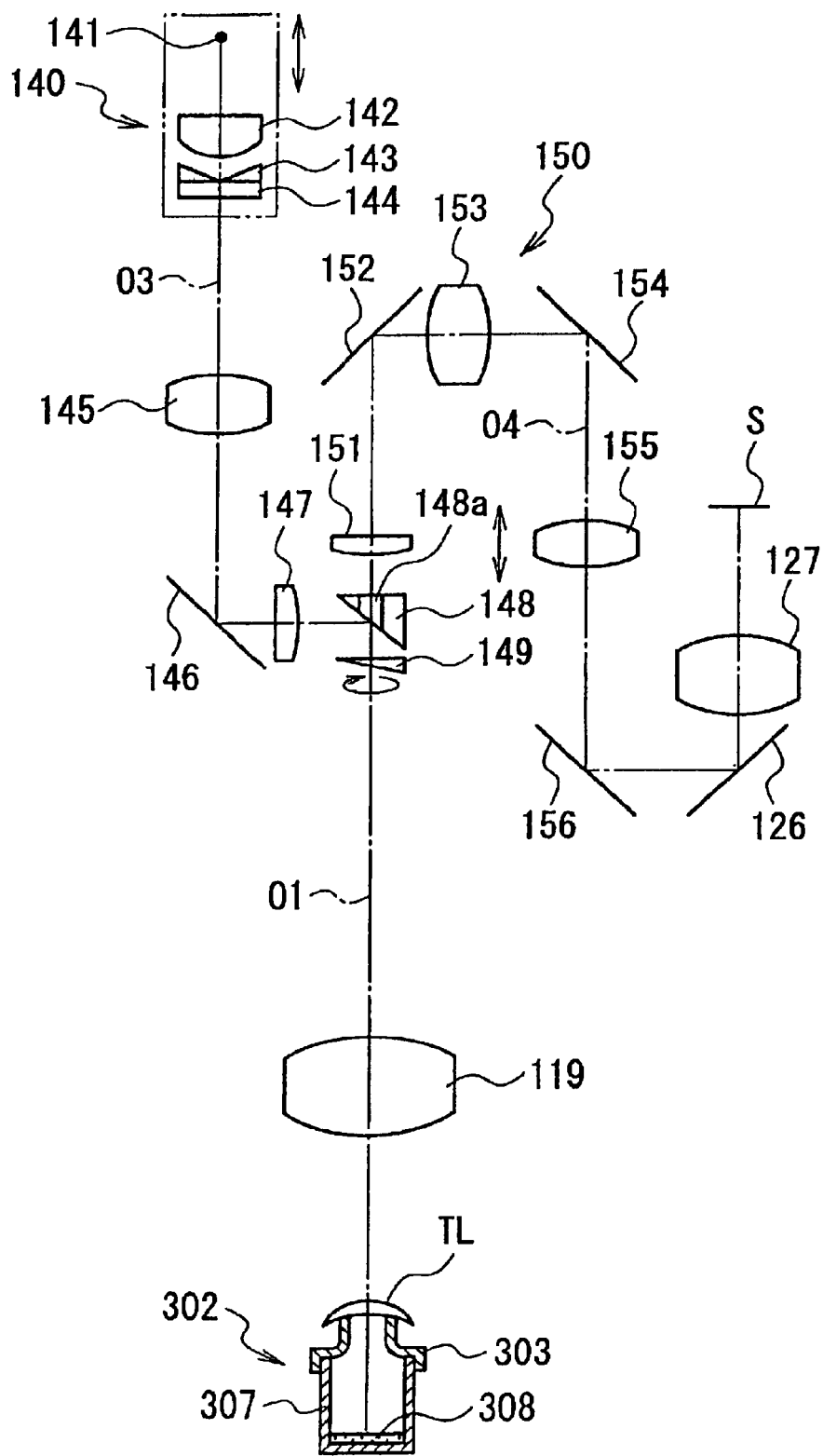
FIG. 25 is an explanatory diagram of an optical system used in the refractive power measuring apparatus of FIG. 24.
Figure 26:
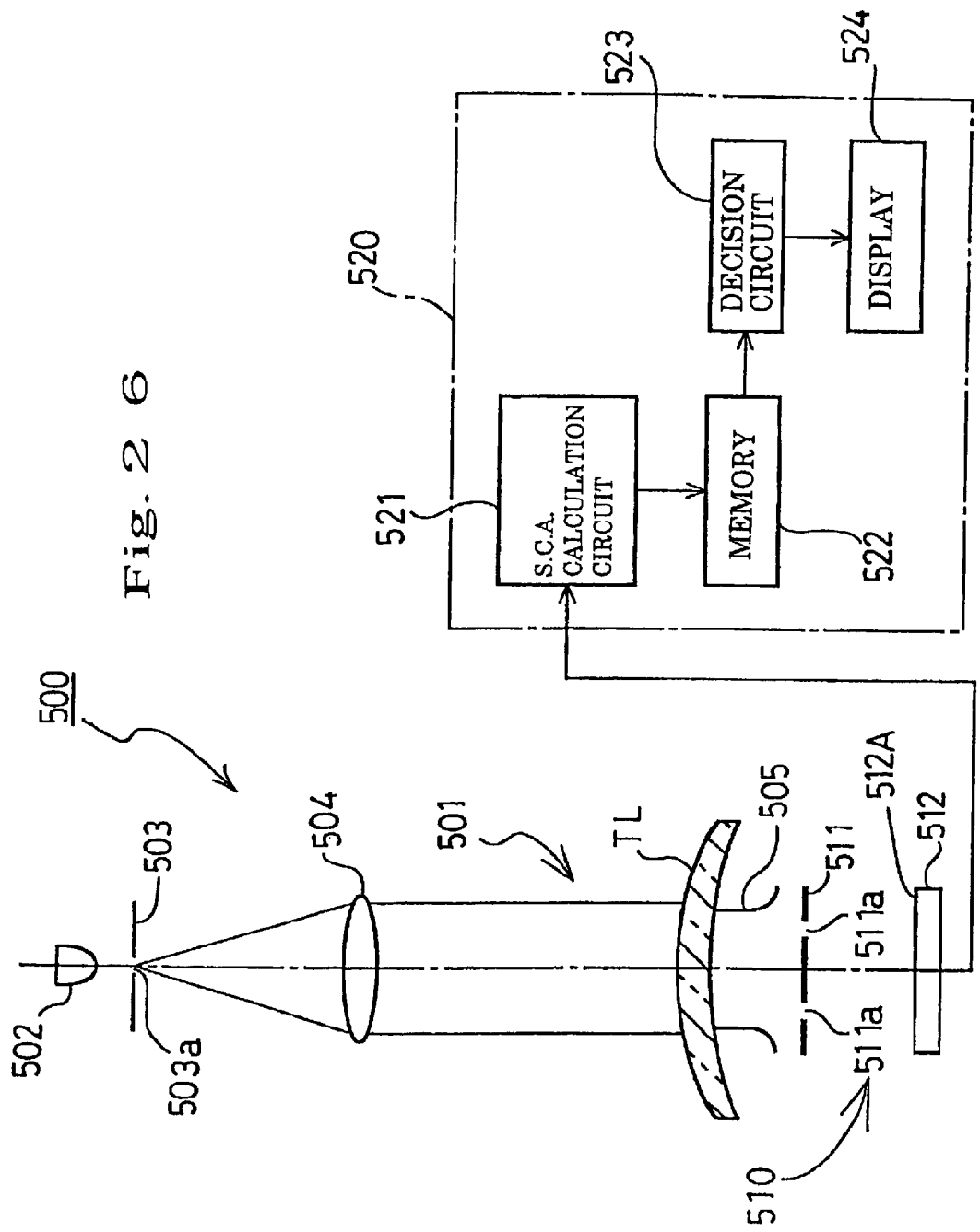
FIG. 26 is an explanatory diagram showing a construction according to a fourth embodiment of the present invention.

In this construction, a soft contact lens TL is put on the lens rest 204 as in FIGS. 24 and 26 and the light source 141 in the pattern beam projecting optical system 140 is turned ON, whereby a refractive power of the contact lens TL its measured in the same way as in the second embodiment. Therefore, an explanation of this point will here be omitted. In FIG. 25, the light receiving element S and the reflecting mirror 308 are conjugated with each other and so are the ring target plate 144 and the reflecting mirror 308.

According to this construction, even if the degree of wet of the soft contact lens TL is not uniform, it is possible to diminish the influence thereof and measure the optical characteristic values S, C, A. Besides, even when the soft contact lens TL is flawed or stained on its surface or back side or is distorted, the influence thereof can be diminished, permitting measurement of the characteristic values S, C, A.

In measuring the optical characteristic values of the soft contact lens TL, it is desirable that an optical axis deflecting prism 149 be disposed at a position not conjugated with the back side (the side contacting the cornea of the eye to be inspected) of the soft contact lens.

Although in this third embodiment it is the soft contact lens TL that is to be measured for its optical characteristic values, it is also possible to measure optical characteristics of a hard contact lens. In this case, even if the hard contact lens is stained or flawed relatively heavily, it is possible to measure optical characteristics thereof accurately without being influenced by such stain or flaw. In this case it is not necessary to determine optical characteristics of a hard contact lens in a time series manner.

[Fourth Embodiment]

FIG. 26 illustrates a construction of a fourth embodiment of the present invention. A lens meter (a refractive power measuring apparatus) 500 shown in FIG. 26 comprises a measuring optical system 501 which projects a measuring light as a parallel beam onto a soft contact lens TL set on a lens rest 505, a light receiving optical system 510 which receives the measuring light having passed through the soft contact lens TL, and a processor 520 which determines optical characteristics of the soft contact lens TL by an arithmetic processing.

The measuring optical system 501 comprises a light source 502 constituted by an LED, a pinhole plate 503 having a pinhole 503a, and a collimator lens 504 for collimating a light beam which has passed through the pin hole 503a into a parallel beam.

The light receiving optical system 510 comprises a pattern plate 511 and a photosensor (light receiving means) 512 constituted by a CCD for example. In the pattern plate 611 are formed four aperture patterns 511a at equal intervals centered on an optical axis. Pattern images based on the measuring light having passed through the aperture patterns 511a are formed on the photosensor 512.

The processor 520 comprises a calculation circuit 621 which calculates optical characteristics S, C, A of the soft contact lens TL at every predetermined time in accordance with a received light signal provided from the photosensor 512, a memory (storage means) 522 which stores S, C, A calculated by the calculation circuit 521, a decision circuit 523 which determines correct optical characteristics of the soft contact lens TL from a time series of S, C, A stored in the memory 522, and a display 524 which displays the correct optical characteristics determined by the decision circuit 523.

Next, a description will be given below about the operation of the lens meter according to this embodiment.

First, the soft contact lens TL, which is dipped in a preservation liquid, is taken out from a container (not shown) and is set onto the lens rest 505. Then, a main switch (not shown) is turned ON to turn ON a measurement start switch (not shown). As a result, the light source 502 goes ON and a measuring light is emitted from the lit source 502. The measuring light thus emitted passes through the pinhole 503a of the pinhole plate 503 and reaches the collimator lens 504, whereby it is made into a parallel beam. The parallel beam is projected on the soft contact lens TL.

The measuring light which has passed through the soft contact lens TL further passes through the aperture patterns 511a formed in the pattern plate 511 and reaches the photosensor 512. As a result, pattern images based on the aperture patterns 511a of the pattern plate 511 are formed on a light receiving surface 512A of the photosensor 512.

When the soft contact lens TL is not set on the lens rest 505, the same pattern images as the aperture patterns 511a are formed on the light receiving surface 512A of the photosensor 512. In the case where the soft contact lens TL is a concave lens, magnified pattern images are projected on the light receiving surface 612A of the photosensor 512, while in case of the soft contact lens TL being a convex lens, reduced pattern images are formed on the light receiving surface 512A of the photosensor 512. The photosensor 512 outputs received light signals corresponding to the pattern images formed on the light receiving surface 512A, while the calculation circuit 521 calculates S, C, A of the soft contact lens TL on the basis of the received light signal provided from the photosensor 512. Since the method for this calculation is well known, a detailed explanation thereof will here be omitted.

On the basis of received light signals outputted from the photosensor 512 the calculation circuit 521 calculates S, C, A of the soft contact lens TL at every predetermined time and stores the S, C, A values thus obtained into the memory 522.

Figure 27:
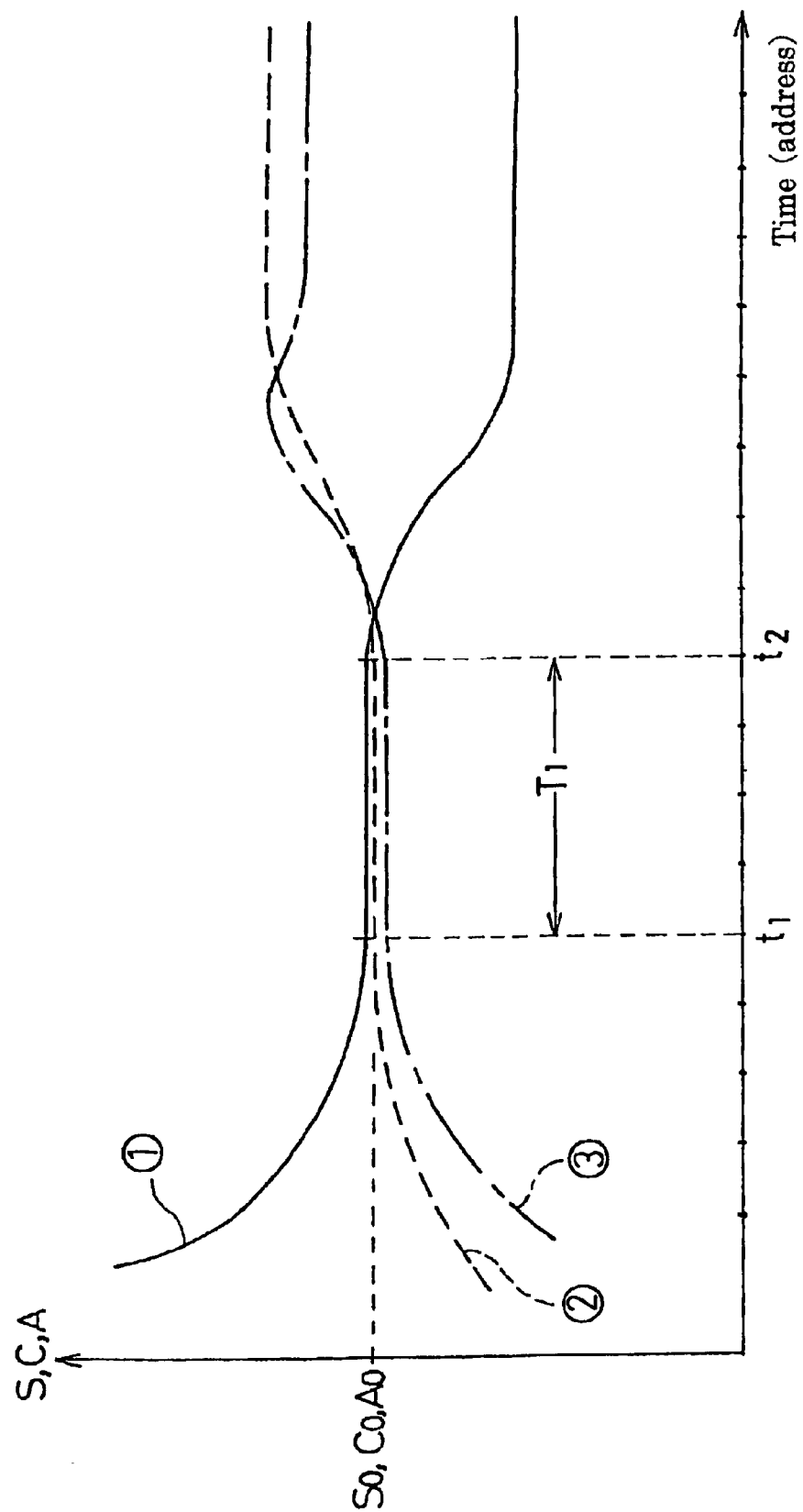
FIG. 27 is a graph showing changes with time in optical characteristics of a soft contact lens.

As shown in FIG. 27, S, C, A are stored in time series into the memory 522.

Water drops are deposited on the surface of the soft contact lens TL which has been taken out from the preservation liquid. The water drops are thick and not uniform in thickness, but are wavy, on the surface of the soft contact lens TL. Consequently, S, C, A values measured at the initial stage with the lens set on the lens rest 505 are largely deviated from A are differentiated and the absolute values of the differential ($|S/\Delta t|$, $|C/\Delta t|$, $|A/\Delta t|$) are below predetermined values and if this state continues for a predetermined time or longer, this period is judged to be the period T1 and the S, C, A values in this period are displayed. Alternatively, a time point t1 at which differential values (rate of change) of changes with time of S, C, A are minimum and a time point t2 at which differential values of changes with time of S, C, A begin to increase, are determined and the period between the time points t1 and t2 is judged to be the period T1.

Thus, by merely placing the wet soft contact lens TL on the lens rest 505 it is possible to accurately mere correct optical characteristics of the soft contact lens TL, so that even a beginner can measure correct optical characteristics of the soft contact lens TL without requiring skill which is required in the prior art.

Although in this fourth embodiment the S, C, A values in the period T1 are displayed on the display 524, the S, C, A values stored in time series in memory 522 may be displayed together with the said display, as shown in FIG. 27.

Although in this fourth embodiment optical characteristics of the soft contact lens TL are measured by the lens meter 500, there may be adopted a method wherein S, C, A values are obtained in time series by the ophthalmic refractive power measuring apparatus 100 described in the second embodiment or the lens refractive power measuring apparatus 400 described in the third embodiment and correct S, C, A values are obtained in the same manner as above from the S, C, A values thus obtained in time series.

[Fifth Embodiment]

Figure 28:
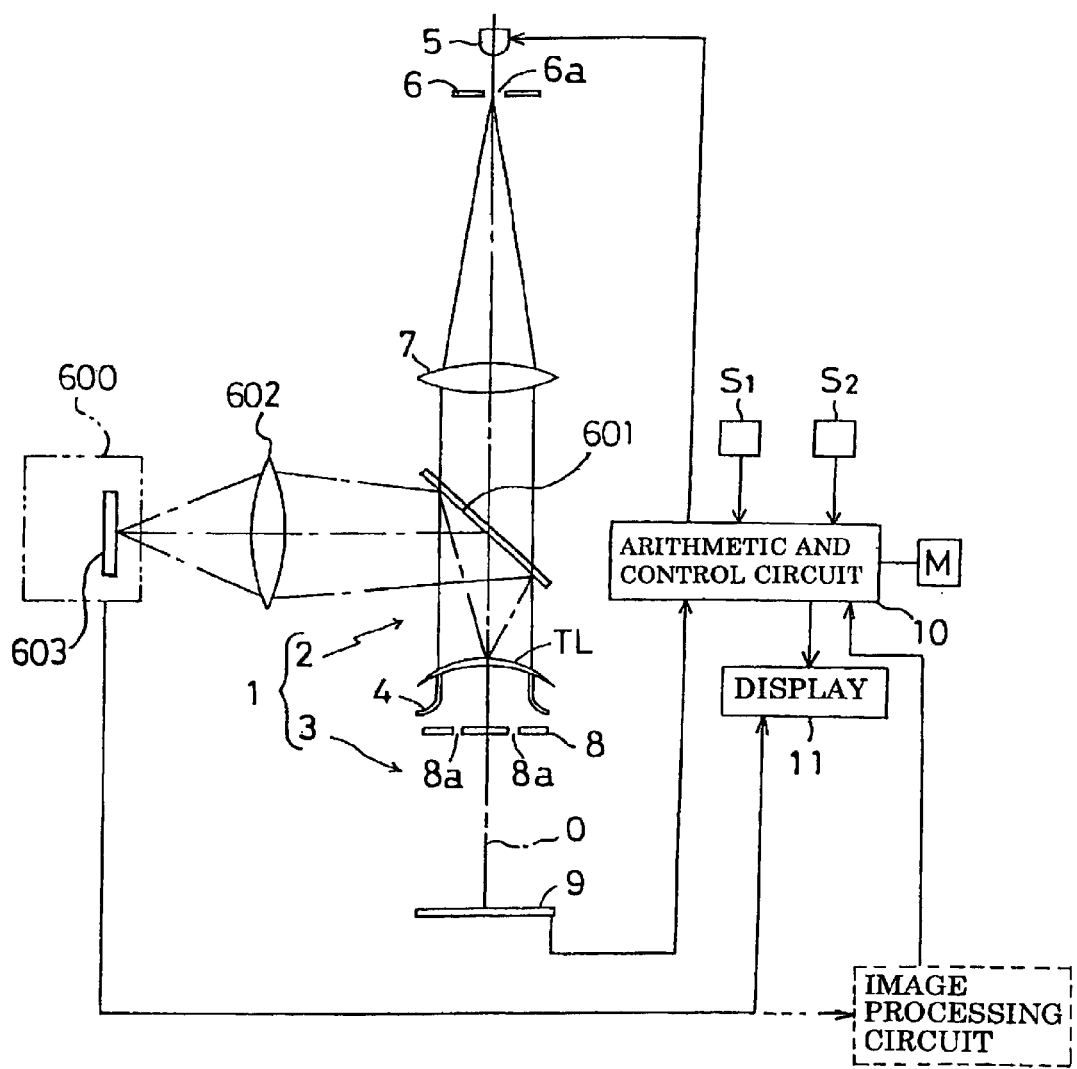
FIG. 28 is an explanatory diagram showing a construction according to a fifth embodiment of the present invention.

FIG. 28 illustrates a fifth embodiment of the present invention, in which the surface of a soft contact lens TL is photographed with a CCD camera 600 and is displayed on the display 11.

In FIG. 28, the numeral 601 denotes a half mirror and numeral 602 denotes an imaging lens. A CCD 603 of the CCD camera 600 and the surface of the soft contact lens TL are at conjugate positions with respect to the imaging lens 602. In this fifth embodiment, a portion of the measuring light beam emitted from the light source 5 is scattered at the surface of the soft contact lens TL and the scattered light is received by the CCD camera 600.

In this fifth embodiment, the surface of the soft contact lens TL displayed on the display 11 is observed and the inspector judges whether the thickness of liquid 14 (see FIG. 4) on the lens surface has become uniform. When the answer is affirmative, S, C, A values of the soft contact lens are measured.

There may be adopted a construction wherein an image processing circuit 605 is provided, as indicated with a broken line, and an image signal on the surface of the soft contact lens TL, which is outputted from the CCD 603, is subjected to an image processing in the image processing circuit 605 to judge that the thickness of the liquid 14 on the lens surface has become uniform. For example, when a luminance value of the image signal has become uniform, it is judged that the thickness of the liquid 14 on the lens surface has become uniform.

In this case, the arithmetic and control circuit 10 measures S, C, A values of the soft contact lens TL repeatedly at every short time, then makes control so that the measured S, C, A values are displayed on the display 11, and updates the S, C, A values displayed on the display 11 at every measurement. When the image processing circuit 605 judges that the thickness of the liquid 14 on the surface of the soft contact lens TL has become uniform, the display of the S, C, A values at this instant is locked. That is, S, C, A values of the soft contact lens TL obtained upon arrival at a uniform thickness of the liquid 14 are displayed on the display 11.

According to another method employable for judging a uniform thickness of the liquid 14, a luminance value of each picture element, or pixel, of the CCD 603 is determined, and when the total number of picture elements whose luminance values fall under a preset range, for example when the said total number has reached 50 percent, it is judged that the thickness of the liquid 14 on the surface of the soft contact lens TL has become uniform.

Although in this fifth embodiment the measuring light beam emitted from the light source 5 is scattered on the surface of the soft contact lens TL and this scattered light is received by the CCD 603 in the CCD camera 600, there may be adopted a modification wherein another light source is provided and a light beam emitted from this light source is radiated to the surface of the soft contact lens TL, then scattered light resulting from scatter on the lens surface is received by the CCD camera 600.

[Sixth Embodiment]

Figure 29:
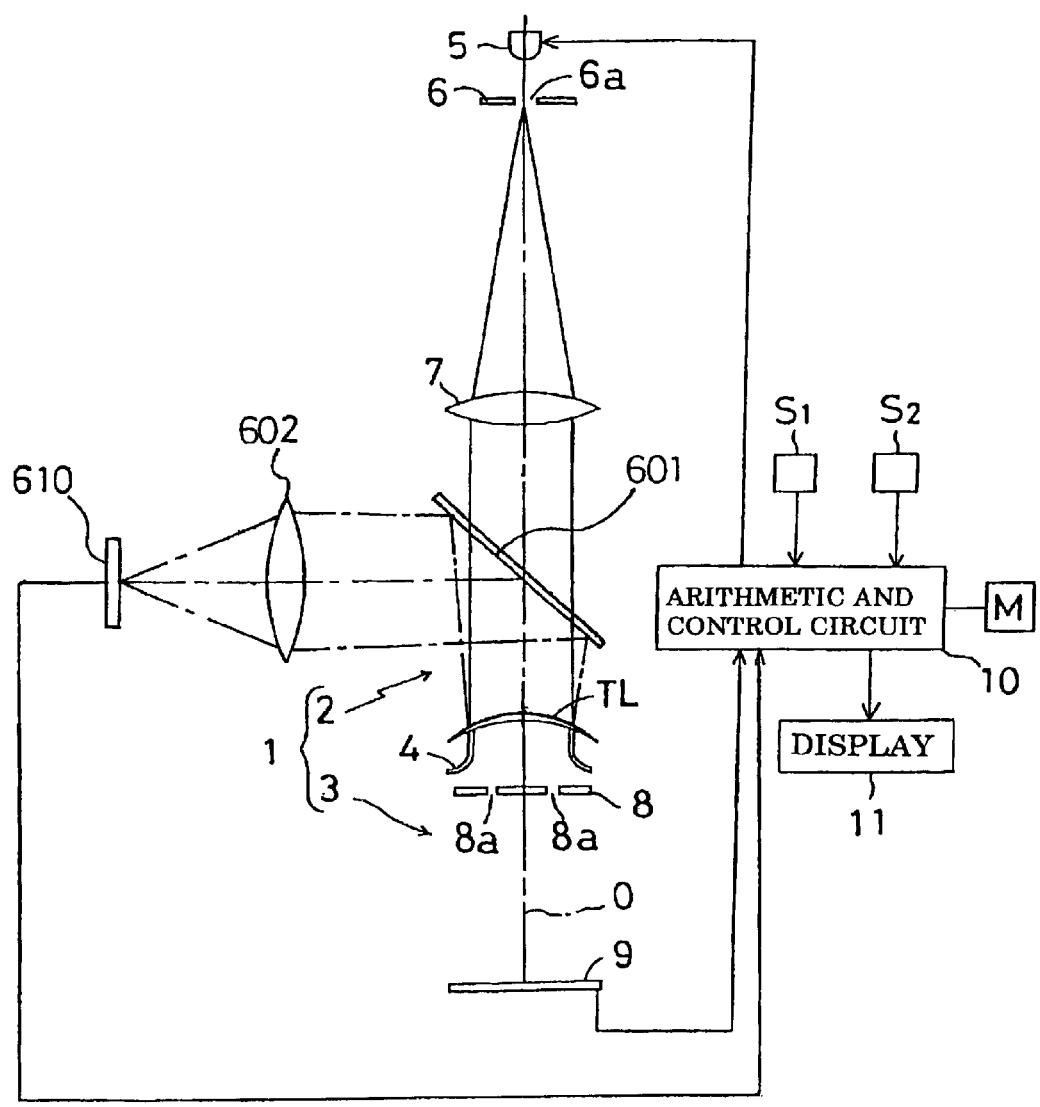
FIG. 29 is an explanatory diagram showing a construction according to a sixth embodiment of the present invention.

FIG. 29 illustrates a sixth embodiment of the present invention. In this sixth embodiment, reflected light (scattered light) reflected by the surface of the soft contact lens TL is received by a light receiving element 610, and on the basis of the amount of light received by the light receiving element 610 it is judged whether the thickness of the liquid 14 on the surface of the soft contact lens TL has become uniform or not. When the liquid thickness on the lens surface is judged to be uniform, S, C, A values of the soft contact lens TL at this instant are displayed on the display 11.

Also in this case, as is the case with the fifth embodiment, S, C, A values of the soft contact lens TL are measured repeatedly at every short time, the measured S, C, A values are displayed on the display 11, and the S, C, A values displayed on the display 11 are updated at every measurement. Then, the instant the thickness of the liquid 14 became uniform, the display of S, C, A values is locked.

The judgment as to whether the thickness of the liquid 14 has become uniform or not is made by the arithmetic and control circuit 10. In this sixth embodiment, the instant the amount of light received by the light receiving element 610 became maximum, it is judged that the thickness of the liquid 14 has become uniform. The light source 5 and the light receiving element 610 are conjugated with each other. The light receiving element 610 may be a CCD.

Although in this sixth embodiment the measuring light beam emitted from the light source 5 is scattered on the surface of the soft contact lens TL and this scattered light is received by the light receiving element 610, there may be adopted a modification wherein another light source is provided and a light beam emitted from this light source is radiated to the surface of the soft contact lens TL, then scattered light on the lens surface is received by the light receiving element 610.

[Seventh Embodiment]

Figure 30:
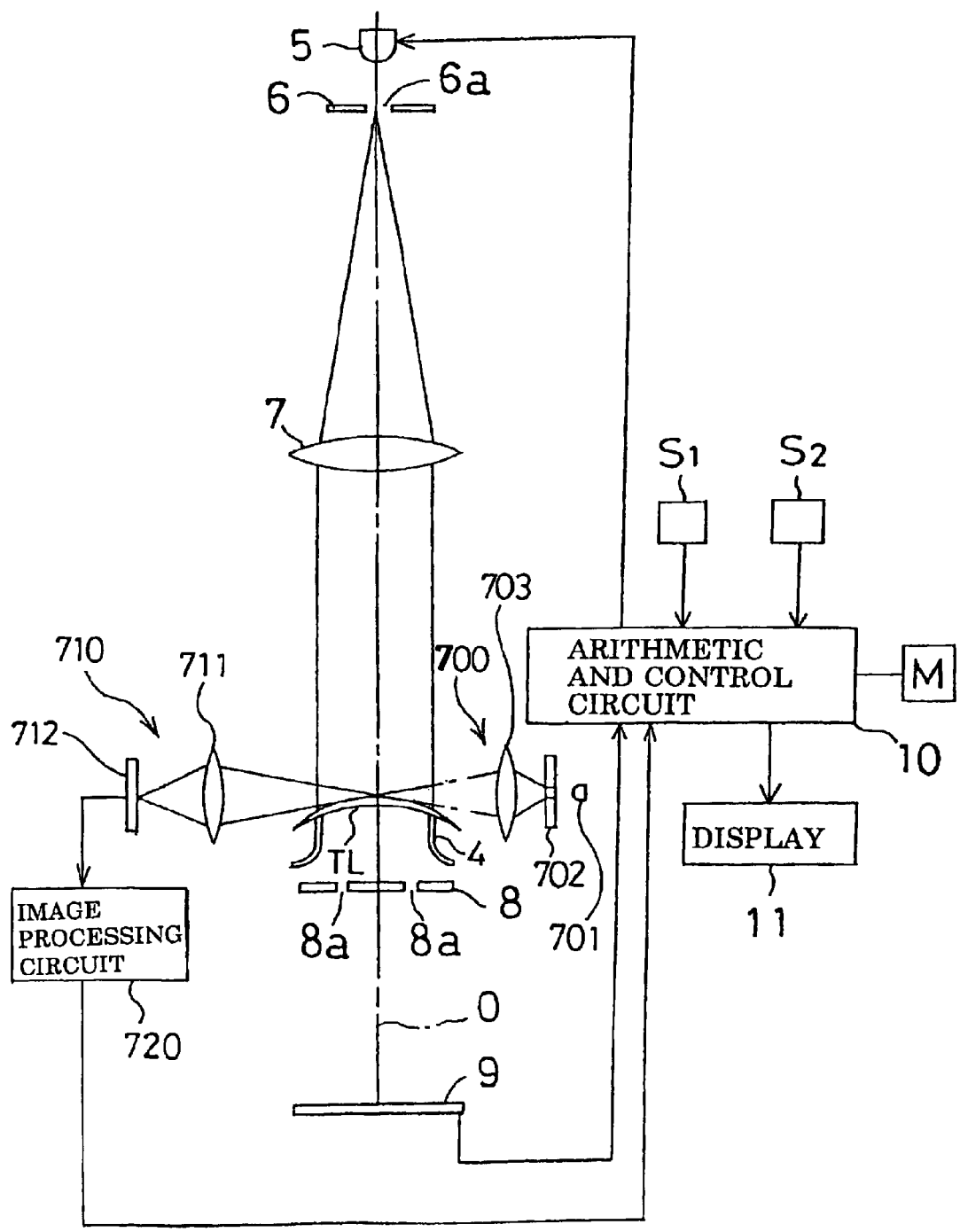
FIG. 30 is an explanatory diagram showing a construction according to a seventh embodiment of the present invention.

FIG. 30 illustrates a seventh embodiment of the present invention. In this seventh embodiment, an illuminating optical system 700 and a light receiving optical system 710 are disposed sideways of the soft contact lens TL in order to judge whether the thickness of liquid 14 on the lens surface has become uniform or not.

The illumination optical system 700 comprises a light source 701, a pinhole plate 702, and a collimator lens 703.

Figure 31:
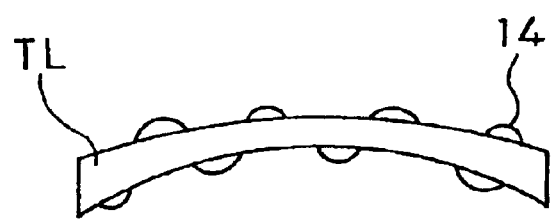
FIG. 31 is an explanatory diagram showing a soft contact lens whose image is formed on a CCD.

The light receiving optical system 710 comprises an imaging lens 711 and a CCD 712. The CCD 712 and a central sectional position of the soft contact lens TL are conjugated with each other. As shown in FIG. 31, a central sectional image of the soft contact lens TL is formed on the CCD 712. That is, focusing is made to the central sectional position of the soft contact lens TL.

An image signal outputted from the CCD 712 is fed to an image processing circuit 720, which in turn performs an image processing for the image signal and judges whether the thickness of the liquid 14 on the soft contact lens TL has become uniform or not. Then, in the same way as in the fifth embodiment S, C, A values of the soft contact lens TL are measured repeatedly at every short time and are displayed on the display 11. Every time the measurement is made the S, C, A values on the display 11 are updated.

Once the image processing circuit 720 judges that the thickness of the liquid 14 on the surface of the soft contact lens TL has become uniform, the display of S, C, A values at this instant is locked and displayed on the display 11.

Effect of the Invention

Since the present invention is constructed as above, optical characteristic values of a soft contact lens can be measured in air precisely.

What is claimed is:

1. A refractive power measuring method for obtaining optical characteristic values of a soft contact lens, wherein:
   when said soft contact lens which is in a wet state is disposed in air and at a certain position in a measuring optical path of a measuring light, light scattered from said soft contact lens is received by a light receiving element, then a state of scatter of said scattered light is detected from a change of a received light signal outputted from said light receiving element, and said optical characteristic values are determined when the received light signal satisfies a predetermined condition.

2. A refractive power measuring method as claimed in claim 1, wherein:
   said light receiving element for receiving the scattered light is a light receiving element for the measurement of a refractive power; and
   said soft contact lens in a wet state is disposed in air and at a certain position in said measuring optical path, scattered light resulting from scatter of said measuring light when passing through said soft contact lens is received by said light receiving element, a state of scatter of said scattered light is determined from a change of said received light signal caused by a change of said scattered light which is received by said light receiving element, and said optical characteristic values are determined when the received light signal outputted from said light receiving element satisfies the predetermined condition.

3. A refractive power measuring method as claimed in claim 1, wherein:
   said light receiving element for receiving the scattered light is a second light receiving element for receiving a surface-reflected light, said light receiving element being provided separately from a light receiving element for the measurement of a refractive power; and
   a state of scatter of scattered light resulting from projection of said measuring light on said soft contact lens and reflection thereof on a surface of the soft contact lens in a wet state being disposed in air and at a certain position in said measuring optical path, is received by said second light receiving element and is determined from a change of the received light signal outputted from said second light receiving element, and when the received light signal outputted from the second light receiving element satisfies the predetermined condition, said optical characteristic values are determined on the basis of a received light signal outputted from said light receiving element for the measurement of a refractive power.

4. A refractive power measuring method as claimed in claim 1, wherein said light receiving element is a CCD camera for receiving said scattered light, said CCD camera being provided separately from a light receiving element for the measurement of a refractive power, and when image data obtained by performing an image processing for an image signal outputted from said CCD camera is substantially coincident with image data which has been obtained beforehand, in a smooth surface condition of the soft contact lens, it is judged that a state of scatter of a surface-reflected light of said soft contact lens satisfies the predetermined condition, then said optical characteristic values are determined on the basis of a received light signal outputted from the light receiving element for the measurement of a refractive power.

5. A refractive power measuring method as claimed in claim 1, wherein at the beginning of measurement of said soft contact lens, the soft contact lens is wet with an isotonic sodium chloride solution.

6. A refractive power measuring method as claimed in claim 1, wherein the measurement is made through an initial stage in which a large amount of liquid is deposited on a surface of said soft contact lens, an intermediate stage in which said liquid is absorbed by said soft contact lens or evaporates or flows down into a uniform layer, and a last stage in which the absorption of water by the soft contact lens and drying thereof proceed and the surface of the soft contact lens becomes rough, and said optical characteristic values of the soft contact lens are determined from said received light signal in said intermediate stage of measurement.

7. A refractive power measuring method as claimed in claim 1, wherein
   said scattered light is made into a pattern light, and said pattern light is received by said light receiving element; and
   when a soft contact lens is disposed at a certain position in said measuring optical path, a change of said pattern light received by said light receiving element is determined from a change of said received light signal outputted from the light receiving element, and thereby optical characteristic values of said soft contact lens disposed at the certain position in said measuring optical path are determined.

8. A refractive power measuring method as claimed in claim 1, wherein optical characteristics of said soft contact lens are calculated at every predetermined time in accordance with the output signal provided from said light receiving element, and correct optical characteristics of the liquid-wet soft contact lens are determined from a time series of the calculated optical characteristics.

9. A refractive power measuring method as claimed in claim 8, wherein the calculated optical characteristics are stored in time series; and correct optical characteristics of the liquid-wet soft contact lens are determined from the optical characteristics stored in time series.

10. A refractive power measuring apparatus for obtaining optical characteristic values of a soft contact lens, comprising:
    a measuring optical system which projects a measuring light on said soft contact lens;
    a light receiving element which receives a pattern light and scattered light from said soft contact lens when the soft contact lens in a wet state is disposed in air and at a certain position in a measuring optical path of a measuring light; and
    a calculation means for calculating said optical characteristic values when the received light signal outputted from said light receiving element satisfies a predetermined condition.

11. A refractive power measuring apparatus as claimed in claim 10, wherein:

said light receiving element is a light receiving element for the measurement of a refractive power; and said calculation means causes said light receiving element to receive the scattered light of said measuring light passed through said soft contact lens which is in a wet state and is disposed in air and at a certain position in said measuring optical path, thereby causing the measurement to be started, and determines a state of scatter of said scattered light from a change of the received light signal caused by a change of said scattered light which is received by the light receiving element, then when the received light signal satisfies the predetermined condition, the calculation means calculates said optical characteristic values of the soft contact lens.

12. A refractive power measuring apparatus as claimed in claim 11, wherein:

said measuring optical system has a pattern light projecting optical system for projecting the pattern light onto a reflecting surface through said soft contact lens;

said light receiving element is provided in a light receiving optical system, said light receiving optical system being for conducting the pattern light to the light receiving element after the pattern light has been reflected by said reflecting surface and returned through said soft contact lens; and said pattern light projecting optical system and said light receiving optical system share a part of respective optical portions, and a deflecting member for deflecting and projecting the pattern light with respect to an optical axis of said pattern light projecting optical system is provided in said shared portion.

13. A refractive power measuring apparatus as claimed in claim 12, wherein said deflecting member is a deflecting prism which is rotated about the optical axis of said pattern light projecting optical system.

14. A refractive power measuring apparatus as claimed in claim 12, wherein said deflecting member is disposed at a position not conjugated with the disposed position of said soft contact lens in measuring optical characteristics of the soft contact lens.

15. A refractive power measuring apparatus as claimed in claim 10, wherein:

said light receiving element is a second light receiving element for receiving a surface-reflected light, said second light receiving element being provided separately from a light receiving element for the measurement of a refractive power, and said calculation means causes a state of scatter of scattered light to be received by said second light receiving element and determines it from a change of the received light signal outputted from said second light receiving element, said scattered light resulting from projection of said measuring light on said soft contact lens and reflection thereof on a surface of the soft contact lens, the soft contact lens being disposed in a wet state in air and at a certain position in said measuring optical path, and when the received light signal outputted from said second light receiving element satisfies the predetermined condition, said calculation means determines said optical characteristic values on the basis of a received light signal outputted from said light receiving element for the measurement of a refractive power.

16. A refractive power measuring apparatus as claimed in claim 15, wherein:

said measuring optical system has a pattern light projecting optical system for projecting the pattern light onto a reflecting surface through said soft contact lens;

said light receiving element is provided in a light receiving optical system, said light receiving optical system being for conducting the pattern light to the light receiving element after the pattern light has been reflected by said reflecting surface and returned through said soft contact lens; and said pattern light projecting optical system and said light receiving optical system share a part of respective optical portions, and a deflecting member for deflecting and projecting the pattern light with respect to an optical axis of said pattern light projecting optical system is provided in said shared portion.

17. A refractive power measuring apparatus as claimed in claim 16, wherein said deflecting member is a deflecting prism which is rotated about the optical axis of said pattern light projecting optical system.

18. A refractive power measuring apparatus as claimed in claim 10, wherein:

said light receiving element is a CCD camera provided separately from a light receiving element for the measurement of a refractive power; and when image data obtained by performing an image processing for an image signal outputted from said CCD camera is substantially coincident with image data which has been obtained beforehand in a smooth surface condition of the soft contact lens, said calculation means judges that a state of scatter of a surface-reflected light of said soft contact lens satisfies the predetermined condition, and determines said optical characteristic values on the basis of a received light signal outputted from the light receiving element for the measurement of a refractive power.

19. A refractive power measuring apparatus as claimed in claim 18, wherein:

said measuring optical system has a pattern light projecting optical system for projecting the pattern light onto a reflecting surface through said soft contact lens;

said light receiving element is provided in a light receiving optical system, said light receiving optical system being for conducting the pattern light to the light receiving element after the pattern light has been reflected by said reflecting surface and returned through said soft contact lens; and said pattern light projecting optical system and said light receiving optical system share a part of respective optical portions, and a deflecting member for deflecting and projecting the pattern light with respect to an optical axis of said pattern light projecting optical system is provided in said shared portion.

20. A refractive power measuring apparatus as claimed in claim 19, wherein said deflecting member is a deflecting prism which is rotated about the optical axis of said pattern light projecting optical system.

21. A refractive power measuring apparatus as claimed in claim 10, wherein the measurement is made through an initial stage in which a large amount of liquid is deposited on a surface of said contact lens, an intermediate stage in which said liquid is absorbed by said soft contact lens or evaporates or flows down into a uniform layer, and a last stage in which the absorption of water by the soft contact lens and drying thereof proceed and the surface of the soft contact lens becomes rough, and said calculation means determines said optical characteristic values of the soft contact lens from said received light signal in said intermediate stage of measurement.

22. A refractive power measuring apparatus as claimed in claim 21, wherein:
   said measuring optical system has a pattern light projecting optical system for projecting the pattern light onto a reflecting surface through said soft contact lens;
   said light receiving element is provided in a light receiving optical system, said light receiving optical system being for conducting the pattern light to the light receiving element after the pattern light has been reflected by said reflecting surface and returned through said soft contact lens; and
   said pattern light projecting optical system and said light receiving optical system share a part of respective optical portions, and a deflecting member for deflecting and projecting the pattern light with respect to an optical axis of said pattern light projecting optical system is provided in said shared portion.

23. A refractive power measuring apparatus as claimed in claim 22, wherein said deflecting member is a deflecting prism which is rotated about the optical axis of said pattern light projecting optical system.

24. A refractive power measuring apparatus as claimed in claim 10, further comprising:
   a pattern light forming means disposed at a certain position in a measuring optical path extending from a light source to said light receiving element, a measuring light emitted from said measuring optical system being made into a pattern light, and said pattern light being received by said light receiving element; wherein
   said calculation means comprises an arithmetic and control circuit which, when said soft contact lens is disposed at a certain position in said measuring optical path, determines a change of the pattern light received by said light receiving element from a change of the received light signal outputted from the light receiving element and thereby determines optical characteristic values of said soft contact lens disposed at a certain position in said measuring optical path,
   said light receiving element comprises a light receiving element portion which receives said pattern light and a scattered light receiving portion which receives scattered light resulting from passage of said measuring light through said soft contact lens and which outputs a received scattered light signal, and
   said calculation means determines said optical characteristic values from said received light signal when said received scattered light signal is below a preset value from the time when said soft contact lens is set in a wet state and measurement is started.

25. A refractive power measuring apparatus as claimed in claim 24, wherein:
   said measuring optical system has a pattern light projecting optical system for projecting the pattern light onto a reflecting surface through said soft contact lens;
   said light receiving element is provided in a light receiving optical system, said light receiving optical system being for conducting the pattern light to the light receiving element after the pattern light has been reflected by said reflecting surface and returned through said soft contact lens; and
   said pattern light projecting optical system and said light receiving optical system share a part of respective optical portions, and a deflecting member for deflecting and projecting the pattern light with respect to an optical axis of said pattern light projecting optical system is provided in said shared portion.

26. A refractive power measuring apparatus as claimed in claim 25, wherein said deflecting member is a deflecting prism which is rotated about the optical axis of said pattern light projecting optical system.

27. A refractive power measuring apparatus as claimed in claim 10, further comprising:
   a decision means,
   wherein said calculation means calculates said optical characteristic values of said soft contact lens in a wet state at every predetermined time in accordance with an output signal provided from said light receiving means; and
   said decision means determines correct optical characteristics of the wet soft contact lens from a time series of optical characteristic values calculated by said calculation means.

28. A refractive power measuring apparatus as claimed in claim 27, wherein:
   said measuring optical system is a pattern light projecting optical system for projecting a pattern light onto a reflecting surface through said soft contact lens, said pattern light being for measuring a refractive power of the soft contact lens;
   said light receiving optical system is for conducting the pattern light to said light receiving means after the pattern light has been reflected by said reflecting surface and returned through said soft contact lens; and
   said pattern light projecting optical system and said light receiving optical system share a part of respective optical portions and a deflecting member for deflecting and projecting the pattern light with respect to an optical axis of said pattern light projecting optical system is provided in said shared portion.

29. A refractive power measuring apparatus as claimed in claim 28, wherein said deflecting member is a deflecting prism which is rotated about the optical axis of said pattern light projecting optical system.

30. A refractive power measuring apparatus as claimed in claim 29, wherein said deflecting member is disposed at a position not conjugated with the disposed position of said soft contact lens in measuring optical characteristics of the soft contact lens.

31. A refractive power measuring apparatus as claimed in claim 28, wherein said deflecting member is disposed at a position not conjugated with the disposed position of said soft contact lens in measuring optical characteristics of the soft contact lens.

32. A refractive power measuring apparatus as claimed in claim 10, further comprising:
   a storage means, and
   a decision means, wherein
   a said calculation means calculates said optical characteristic values of said soft contact lens in a wet state at every predetermined time in accordance with an output signal provided from said light receiving means;
   said storage means stores in time series the optical characteristic values calculated by said calculation means; and
   said decision means determines correct optical characteristic values of the wet soft contact lens from the optical characteristics stored in time series in said storage means.

33. A refractive power measuring apparatus as claimed in claim 32, wherein said decision means determines a period of less variation in the optical characteristics from the optical characteristics stored in time series in said storage means, and determines the optical characteristics in said period to be correct optical characteristics of said soft contact lens.

34. A refractive power measuring apparatus as claimed in claim 33, wherein:
   said measuring optical system is a pattern light projecting optical system for projecting a pattern light onto a reflecting surface through said soft contact lens, said pattern light being for measuring a refractive power of the soft contact lens;
   said light receiving optical system is for conducting the pattern light to said light receiving means after the pattern light has been reflected by said reflecting surface and returned through said soft contact lens; and
   said pattern light projecting optical system and said light receiving optical system share a part of respective optical portions and a deflecting member for deflecting and projecting the pattern light with respect to an optical axis of said pattern light projecting optical system is provided in said shared portion.

35. A refractive power measuring apparatus as claimed in claim 32, wherein said decision means determines a period in which a variation in the optical characteristics is kept below a predetermined value over a certain time or longer, on the basis of the optical characteristics stored in time series in said storage means, and determines the optical characteristics in said period to be correct optical characteristics of said soft contact lens.

36. A refractive power measuring apparatus as claimed in claim 35, wherein:
   said measuring optical system is a pattern light projecting optical system for projecting a pattern light onto a reflecting surface through said soft contact lens, said pattern light being for measuring a refractive power of the soft contact lens;
   said light receiving optical system is for conducting the pattern light to said light receiving means after the pattern light has been reflected by said reflecting surface and returned through said soft contact lens; and
   said pattern light projecting optical system and said light receiving optical system share a part of respective optical portions and a deflecting member for deflecting and projecting the pattern light with respect to an optical axis of said pattern light projecting optical system is provided in said shared portion.

37. A refractive power measuring apparatus as claimed in claim 32, wherein said decision means regards the optical characteristics in a period from the time when the rate of a change with time of the optical characteristics is minimum until the time when said rate of change begins to increase as correct optical characteristics of said soft contact lens.

38. A refractive power measuring apparatus as claimed in claim 37, wherein:
   said measuring optical system is a pattern light projecting optical system for projecting a pattern light onto a reflecting surface through said soft contact lens, said pattern light being for measuring a refractive power of the soft contact lens;
   said light receiving optical system is for conducting the pattern light to said light receiving means after the pattern light has been reflected by said reflecting surface and returned through said soft contact lens; and
   said pattern light projecting optical system and said light receiving optical system share a part of respective optical portions and a deflecting member for deflecting and projecting the pattern light with respect to an optical axis of said pattern light projecting optical system is provided in said shared portion.

39. A refractive power measuring apparatus as claimed in claim 32, wherein:
   said measuring optical system is a pattern light projecting optical system for projecting a pattern light onto a reflecting surface through said soft contact lens, said pattern light being for measuring a refractive power of the soft contact lens;
   said light receiving optical system is for conducting the pattern light to said light receiving means after the pattern light has been reflected by said reflecting surface and returned through said soft contact lens; and
   said pattern light projecting optical system and said light receiving optical system share a part of respective optical portions and a deflecting member for deflecting and projecting the pattern light with respect to an optical axis of said pattern light projecting optical system is provided in said shared portion.

40. A refractive power measuring apparatus as claimed in claim 10, wherein:
   said measuring optical system has a pattern light projecting optical system for projecting the pattern light onto a reflecting surface through said soft contact lens;
   said light receiving element is provided in a light receiving optical system, said light receiving optical system being for conducting the pattern light to the light receiving element after the pattern light has been reflected by said reflecting surface and returned through said soft contact lens; and
   said pattern light projecting optical system and said light receiving optical system share a part of respective optical portions, and a deflecting member for deflecting and projecting the pattern light with respect to an optical axis of said pattern light projecting optical system is provided in said shared portion.

41. A refractive power measuring apparatus as claimed in claim 40, wherein said deflecting member is a deflecting prism which is rotated about the optical axis of said pattern light projecting optical system.

42. A refractive power measuring apparatus as claimed in claim 40, wherein said deflecting member is disposed at a position not conjugated with the disposed position of said soft contact lens in measuring optical characteristics of the soft contact lens.

* * * * *

UNITED STATES PATENT AND TRADEMARK OFFICE
CERTIFICATE OF CORRECTION

PATENT NO. : 6,937,328 B2
DATED : August 30, 2005
INVENTOR(S) : Fukuma et al.

It is certified that error appears in the above-identified patent and that said Letters Patent is hereby corrected as shown below:

Title page,
Insert Item
-- [30]   Foreign Application Priority Data
   August 11, 2000   (JP).................................2000-244642
   August 11, 2000   (JP).................................2000-244109 --.

Signed and Sealed this

Fourteenth Day of March, 2006

JON W. DUDAS
*Director of the United States Patent and Trademark Office*